US00RE41750E

(19) United States
(12) Reissued Patent
Christy

(10) Patent Number: US RE41,750 E
(45) Date of Reissued Patent: *Sep. 21, 2010

(54) APPARATUS AND METHOD FOR REDIRECTION OF NETWORK MANAGEMENT MESSAGES IN A CLUSTER OF NETWORK DEVICES

(75) Inventor: James E. Christy, Sunnyvale, CA (US)

(73) Assignee: Cisco Technology, Inc., San Jose, CA (US)

( * ) Notice: This patent is subject to a terminal disclaimer.

(21) Appl. No.: 10/942,081

(22) Filed: Sep. 14, 2004

Related U.S. Patent Documents

Reissue of:
(64) Patent No.: 6,725,264
Issued: Apr. 20, 2004
Appl. No.: 09/505,518
Filed: Feb. 17, 2000

(51) Int. Cl.
*G06F 15/173* (2006.01)
*G06F 15/16* (2006.01)
*H04L 12/28* (2006.01)

(52) U.S. Cl. ..... 709/225; 709/223; 709/246; 370/389

(58) Field of Classification Search ..... 709/225, 709/229, 223, 244, 245, 246, 220; 370/389, 370/392, 401, 409, 338, 402, 398
See application file for complete search history.

(56) References Cited

U.S. PATENT DOCUMENTS

| | | | |
|---|---|---|---|
| 4,644,532 | A | 2/1987 | George et al. |
| 4,922,486 | A | 5/1990 | Lidinsky et al. |
| 4,933,937 | A | 6/1990 | Konishi |
| 4,962,497 | A | 10/1990 | Ferenc et al. |
| 5,095,480 | A | 3/1992 | Fenner |
| 5,136,580 | A | 8/1992 | Videlock et al. |
| 5,241,682 | A | 8/1993 | Bryant et al. |
| 5,274,631 | A | 12/1993 | Bhardwaj |
| 5,280,480 | A | 1/1994 | Pitt et al. |
| 5,287,103 | A | 2/1994 | Kasprzyk et al. |
| 5,319,644 | A | 6/1994 | Liang |
| 5,367,635 | A | 11/1994 | Bauer et al. |

(Continued)

FOREIGN PATENT DOCUMENTS

| | | | |
|---|---|---|---|
| EP | 0 567 217 | | 10/1993 |
| EP | 690384 | A2 * | 1/1996 |
| WO | 99/53408 | * | 10/1999 |
| WO | WO 200044128 | A1 * | 7/2000 |
| WO | WO 200217094 | A1 * | 2/2002 |
| WO | WO 2002235801 | A2 * | 5/2002 |
| WO | WO 2002102012 | A2 * | 12/2002 |

OTHER PUBLICATIONS

Hinden, R. et al.,"IP Vesion 6 Addressing Architecture", RFC 1884, p.1–18, Dec. 1995.*

(Continued)

*Primary Examiner*—Douglas B Blair
(74) *Attorney, Agent, or Firm*—BainwoodHuang

(57) ABSTRACT

A method manages a cluster of network devices each having an intra-cluster identifier. The method includes (a) selecting a plurality of network devices to form a cluster, (b) selecting a first network device to be a commander network device having a public IP address, each of the remaining network devices being a cluster member network device and having a non-public network address, (c) receiving at the commander network device a network management request message from a management console, the message including a source address field containing an IP address of the management console, a destination address field containing the IP address of the commander network device, a request identification field containing an original request identifier uniquely identifying the message, and an intra-cluster identifier, and (d) forwarding the message to the-cluster member network device identified by the intra-cluster identifier using the non-pubic network address of the cluster member network device.

98 Claims, 11 Drawing Sheets

U.S. PATENT DOCUMENTS

| | | | | | |
|---|---|---|---|---|---|
| 5,371,852 | A | | 12/1994 | Attanasio et al. | |
| 5,390,170 | A | | 2/1995 | Sawant et al. | |
| 5,394,402 | A | | 2/1995 | Ross | |
| 5,430,715 | A | | 7/1995 | Corbalis et al. | |
| 5,473,607 | A | | 12/1995 | Hausman et al. | |
| 5,502,725 | A | | 3/1996 | Pohjakallio | |
| 5,530,963 | A | | 6/1996 | Moore et al. | |
| 5,594,732 | A | | 1/1997 | Bell et al. | |
| 5,610,910 | A | | 3/1997 | Focsaneanu et al. | |
| 5,617,421 | A | | 4/1997 | Chin et al. | |
| 5,671,354 | A | | 9/1997 | Ito et al. | |
| 5,678,006 | A | | 10/1997 | Valizadeh et al. | |
| 5,715,394 | A | | 2/1998 | Jabs | |
| 5,734,654 | A | | 3/1998 | Shirai et al. | |
| 5,764,910 | A | | 6/1998 | Shachar | |
| 5,793,763 | A | | 8/1998 | Mayes et al. | |
| 5,802,047 | A | | 9/1998 | Kinoshita | |
| 5,812,529 | A | | 9/1998 | Czarnik et al. | |
| 5,812,776 | A | | 9/1998 | Gifford | |
| 5,835,720 | A | | 11/1998 | Nelson et al. | |
| 5,835,725 | A | | 11/1998 | Chiang et al. | |
| 5,845,087 | A | | 12/1998 | Trehus | |
| 5,854,901 | A | | 12/1998 | Cole et al. | |
| 5,867,666 | A | | 2/1999 | Harvey | |
| 5,872,783 | A | | 2/1999 | Chin | |
| 5,905,736 | A | | 5/1999 | Ronen et al. | |
| 5,918,016 | A | | 6/1999 | Brewer et al. | |
| 5,968,116 | A | | 10/1999 | Day, II et al. | |
| 5,974,453 | A | | 10/1999 | Andersen et al. | |
| 5,978,845 | A | * | 11/1999 | Reisacher | 709/223 |
| 5,991,810 | A | | 11/1999 | Shapiro et al. | |
| 5,999,536 | A | * | 12/1999 | Kawafuji et al. | 370/401 |
| 6,003,077 | A | * | 12/1999 | Bawden et al. | 370/392 |
| 6,006,264 | A | | 12/1999 | Colby et al. | |
| 6,011,910 | A | | 1/2000 | Chau et al. | |
| 6,012,088 | A | | 1/2000 | Li et al. | |
| 6,018,770 | A | | 1/2000 | Little et al. | |
| 6,021,429 | A | | 2/2000 | Danknick | |
| 6,023,724 | A | | 2/2000 | Bhatia et al. | |
| 6,047,376 | A | | 4/2000 | Hosoe | |
| 6,055,236 | A | * | 4/2000 | Nessett et al. | 370/389 |
| 6,091,951 | A | * | 7/2000 | Sturniolo et al. | 455/432.2 |
| 6,092,196 | A | | 7/2000 | Reiche | |
| 6,119,160 | A | | 9/2000 | Zhang et al. | |
| 6,122,657 | A | | 9/2000 | Hoffman, Jr. et al. | |
| 6,266,335 | B1 | * | 7/2001 | Bhaskaran | 370/399 |
| 6,295,276 | B1 | * | 9/2001 | Datta et al. | 370/218 |
| 6,330,602 | B1 | | 12/2001 | Law et al. | |
| 6,339,595 | B1 | * | 1/2002 | Rekhter et al. | 709/223 |
| 6,360,258 | B1 | * | 3/2002 | LeBlanc | 709/223 |
| 6,360,262 | B1 | * | 3/2002 | Guenthner et al. | 709/226 |
| 6,378,053 | B1 | | 4/2002 | Lamaire et al. | |
| 6,449,647 | B1 | * | 9/2002 | Colby et al. | 700/226 |
| 6,470,389 | B1 | | 10/2002 | Chung et al. | |
| 6,633,560 | B1 | * | 10/2003 | Albert et al. | 370/351 |
| 6,636,499 | B1 | * | 10/2003 | Dowling | 370/338 |
| 6,654,796 | B1 | * | 11/2003 | Slater et al. | 709/220 |
| 6,725,264 | B1 | * | 4/2004 | Christy | 709/225 |
| 6,779,039 | B1 | * | 8/2004 | Bommareddy et al. | 709/238 |
| 6,831,918 | B1 | * | 12/2004 | Kavak | 370/395.52 |
| 6,856,591 | B1 | * | 2/2005 | Ma et al. | 370/216 |
| 6,895,433 | B1 | * | 5/2005 | Slater et al. | 709/220 |
| 6,917,626 | B1 | * | 7/2005 | Duvvury | 370/466 |

OTHER PUBLICATIONS

Hee–Sook Park, "Address translation mehtod for interworking between public and private ATM networks", IEEE Conf. on Information Networking, p. 669–672, Jan. 1998.*

Romascanu, D. et al., "Switch montoring the new generation of monitoring for local area networks", Bell Labs Technical Journal, v 4 i 4, p. 42–54, Dec. 1999.*

Raz, D. et al.,"Economically managing mulitple private data networks", Proceedings of Network Operations and Management Sumposium, AT&T Bell Labs, p. 491–503, Apr. 2000.*

"*Active Software's Integration System*", Active Software Inc., printed from http://www.activesw.com/products/products.html, Jul. 1998.

Brancho, Dr. Rafael, "*Integrating the Corporate Computing Environment with Active Software*", Nov. 18, 1998, Active Software, Inc., pp. 1–17.

Bracho, Dr. Rafael, "*Mastering Corporate Computing with the Active Web System*", 1996, Active Software Inc.

Cisco Systems, Inc., "*Configuration and Management*", printed from http://www.cisco.com/universed/cc/td/doc/product/lan/2801900/1928v67x/19icg67x/19icouth.htm, May 27, 1999, 62 pages.

Cisco Systems, Inc., "*LAN Switching*", printed from http://www.cisco.com/univered/cc/td/doc/cisntwk/ics/cs010.htm, on May 27, 1999, 6 pages.

Cisco Systems Inc., "*Web–Based Management*", printed from http://ww.cisco.com/univered/cc/td/doc/product/lan/c2900xl/c2900xl/c2900sa3icg/mainstal.htm#1811, May 28, 1999, 44 pages.

Droms, R., "*Dynamic Host Configuration Protocol*", Network Working Group, RFC 1531, Oct. 1993.

Edell, Richard, "*Bay Bridge Software Architecture*", University of California, Berkeley, CA, Department of Electrical Engineering and Computer Science, May 17, 1994.

Cicso Systems, Inc., "*DHCP Solutions Helsp Scale and Configure IP Nodes in Growing Switched Networks*", Sep. 10, 1998, http://cio.cisco.jp/warp/public/795/6.html,, 1–2.

"*Hot Products & Solutions—IP Address Management: A White Paper*", Jul. 24, 1998, http://www.american.com/ip–mgmt.html, pp. 2–18.

"*NAT and Networks*", Sep. 19, 1998, http://www.csn.tu–chem–nitz.de/~mha/linux–ipnat/diplom/node4.html.

"*NAT–PC Webopaedia Definition and Links*", Sep. 19, 1998, http://webopedia.internet.com/TERM/N/NAT.html, 1 pg.

"*Network Address Translation Information*", Sep. 19, 1998, http://www.uq.edu.au/~gadmacka/content/natinformation.htm, pp. 1–2.

"*Regain Confidence and Control Over Your IP Address Infrastructure*", Network Registrar, American Internet Corporation, Bedford, MA, pp. 1–4.

"*Three Ways to Manage IP Addresses*", Sep. 10, 1998, http://www.zdnet.com/pcmag/features/ipmanage/ip–s2.htm, pp. 1–2.

Cisco Systems, Inc. "Realease Notes for the Cisco 1400 Series Routeers for Cisco IOS Release 12.0 T", Corporate Headquarters, Text Part No. 78–6237–02, Rev. B0, pp. 1–28, Mar. 1999.*

Cherkaoui, O. et al., "SNMPv3 can still be simple?", IEEE International Distributed Management for the Networked Millennium, ISBN: 0–7803–5748–5, pp. 501–515, May 1999.*

Quittek, J. et al., "Practical Experiences with Script MIB Applications", www.simple–times.org, vol. 7, No. 2, pp. Nov. 12–14, 1999.*

Raz, D. et al., "An SNMP Application Level Gateway for Payload Address Translation", RFC 2962, pp. 1–20, Oct. 2000.*

* cited by examiner

APPARATUS AND METHOD FOR REDIRECTION OF NETWORK MANAGEMENT MESSAGES IN A CLUSTER OF NETWORK DEVICES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the field of data communications networks. More particularly, the present invention relates to an apparatus and method for redirecting network management messages in a cluster of network devices.

2. Background

Two types of data communication networks known to those skilled in the art are Local Area Networks ("LANs") and Wide Area Networks ("WAN"). Network devices are used to transmit information across networks, which may include various combinations of LANs and WANs. Without limitation, such network devices may include switches, bridges, and routers. "Switching" refers to a technology in which a network device (known as a switch) connects two or more LAN segments. A switch transmits frames of data from one segment to their destinations on the same or other segments. When a switch in an Ethernet LAN begins to operate, it examines the Media Access Control ("MAC") address embedded in the frames that flow through it to build a table of known sources. If the switch determines that the destination of a frame is on the same segment as the source of the frame, it drops, or filters, the frame because there is no need to transmit it. If the switch determines that the destination is on another segment, it transmits the frame onto the destination segment only. Finally, using a technique known as flooding, if the destination segment is unknown, the switch transmits the frame on all segments except the source segment.

Because a switch maintains a table of the source MAC addresses received on every port, it "learns" to which port a station is attached every time the station transmits. Then, each packet that arrives for that station is forwarded only to the correct port, eliminating the waste of bandwidth on the other ports. Since station addresses are relearned every time a station transmits, if stations are relocated the switch will reconfigure its forwarding table immediately upon receiving a transmission from the stations.

An Ethernet LAN switch improves bandwidth by separating collision domains and selectively forwarding traffic to the appropriate segments. FIG. 1 illustrates the topology of a typical Ethernet network 100 in which a LAN switch 110 has been installed. As shown in FIG. 1, LAN switch 110 has five ports: 120, 130, 140, 150, and 160. The first port 120 is connected to LAN segment 125. The second port 130 is connected to LAN segment 135. The third port 140 is connected to LAN segment 145. The fourth port 150 is connected to LAN segment 155. The fifth port 160 is connected to LAN segment 165. The Ethernet network 100 also includes a plurality of servers 170-A–170-C and a plurality of clients 180-A–180-K, each of which is attached to one of the LAN segments 125, 135, 145, 155, or 165. If server 170-A on port 120 needs to transmit to client 180-D on port 130, the LAN switch 110 forwards Ethernet frames from port 120 to port 130, thus sparing ports 140, 150, and 160 from frames destined for client 180-D. If server 170-C needs to send data to client 180-J at the same time that server 170-A sends data to client 170-D, it can do so because the LAN switch can forward frames from port 140 to port 150 at the same time it is forwarding frames from port 120 to port 130. If server 170-A on port 120 needs to send data to client 180-C, which is also connected to port 120, the LAN switch 110 does not need to forward any frames.

Thus, performance improves in LANs in which LAN switches are installed because the LAN switch creates isolated collision domains. By spreading users over several collision domains, collisions are avoided and performance improves. In addition, many LAN switch installations dedicate certain ports to a single users, giving those users an effective bandwidth of 10 Mbps when using traditional Ethernet. As a LAN grows, either due to additional users or network devices, additional switches must often be added to the LAN and connected together to provide more ports and new network segments.

As LAN and WAN topologies become more complex, network management tools become critically important. As is known to those skilled in the art, the Simple Network Management Protocol ("SNMP") is one currently popular example of a network management tool. SNMP is a simple request/response protocol that communicates management information between two types of SNMP software entities: SNMP applications (also called SNMP managers) and SNMP agents.

SNMP applications are typically executed in a network management station, and issue queries to gather information about the status, configuration, and performance of external network devices (called network elements in SNMP terminology). The CiscoWorks™ software package, available from Cisco Systems, Inc. of San Jose, Calif., is an example of a network management station, and a LAN switch is an example of a network element that can be managed using SNMP. Relevant details of the SNMP protocol will be discussed in subsequent sections of this document.

Traditionally, network device installation includes inserting the device into the network and assigning it an Internet Protocol ("IP") address, which is typically a 32-bit number assigned to hosts that want to participate in a TCP/IP Internet. Newer versions of the IP protocol may use more bits for the IP address. The IP address of a network device is a unique address that specifies the logical location of a host or client on the Internet.

Once a network device has been assigned an IP address, a network administrator can enter the device's IP address into a network management station to access the network device and to configure it from anywhere in the Internet using a protocol such as SNMP. However, currently, each network device to be configured and managed must have its own IP address, which must be registered with a domain name service ("DNS"). Assigning an IP address to each and every network device is undesirable, because registering IP addresses with a DNS is both costly and cumbersome.

In order to implement a paradigm where several different devices can be managed and configured as a single network entity (called a "cluster"), what is needed is a way to allow all the device in a cluster to share a single IP address for the purposes of network management. Accordingly, it would be convenient for a network administrator to be able to assign a single IP address to one network device in a cluster, and then to be able to configure and manage all of the network devices in the cluster using this single IP address. Unfortunately, no current mechanism exists to enable this activity. The present invention provides an apparatus and method which permits an entire cluster of network devices to share a single IP address for the purposes of network management, and to provide a commander device which redirects network management data requests and responses (such as SNMP messages) to and from other devices in the cluster. These and other features and advantages of the present invention will be presented in more detail in the following specification of the invention and in the associated figures.

SUMMARY OF THE INVENTION

A group of network devices, such as Ethernet switches, are logically configured as a single cluster, with one commander device and one or more member devices. Each device in the cluster is capable of supporting a network management protocol and contains its own management information base. Each device in the cluster is identified by a unique identifier such as a unique community string in the case of a Simple Management Network Protocol ("SNMP") implementation. Each device in the cluster may also be uniquely identified by a Media Access Control ("MAC") address if so desired in a particular implementation. However, only the cluster commander is required to have an IP address. The cluster commander redirects and translates network management messages from one or more management consoles destined for member devices so that the messages are processed by the appropriate cluster device. Responses to network management messages from the cluster device are received by the commander device and redirected to the appropriate management console. Information exchange between one or more management consoles and the devices in the cluster can be accomplished via redirection of SNMP requests and responses, thus providing a consistent, device-independent interface between the devices in the cluster and the management console.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons having the benefit of this disclosure. The same reference numbers will be used throughout the drawings and the following description to refer to the same or like parts.

Figure 1:
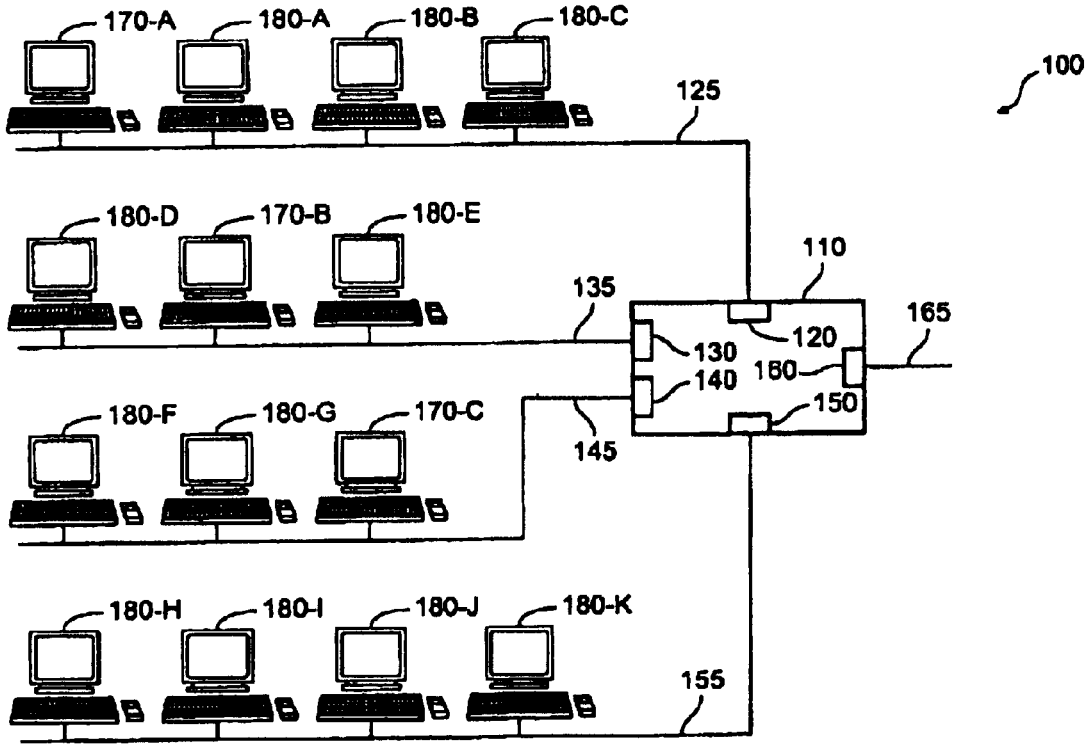
FIG. 1 (PRIOR ART)
FIG. 1 is a block diagram illustrating the topology of an exemplary LAN incorporating a LAN switch.
Figure 2:
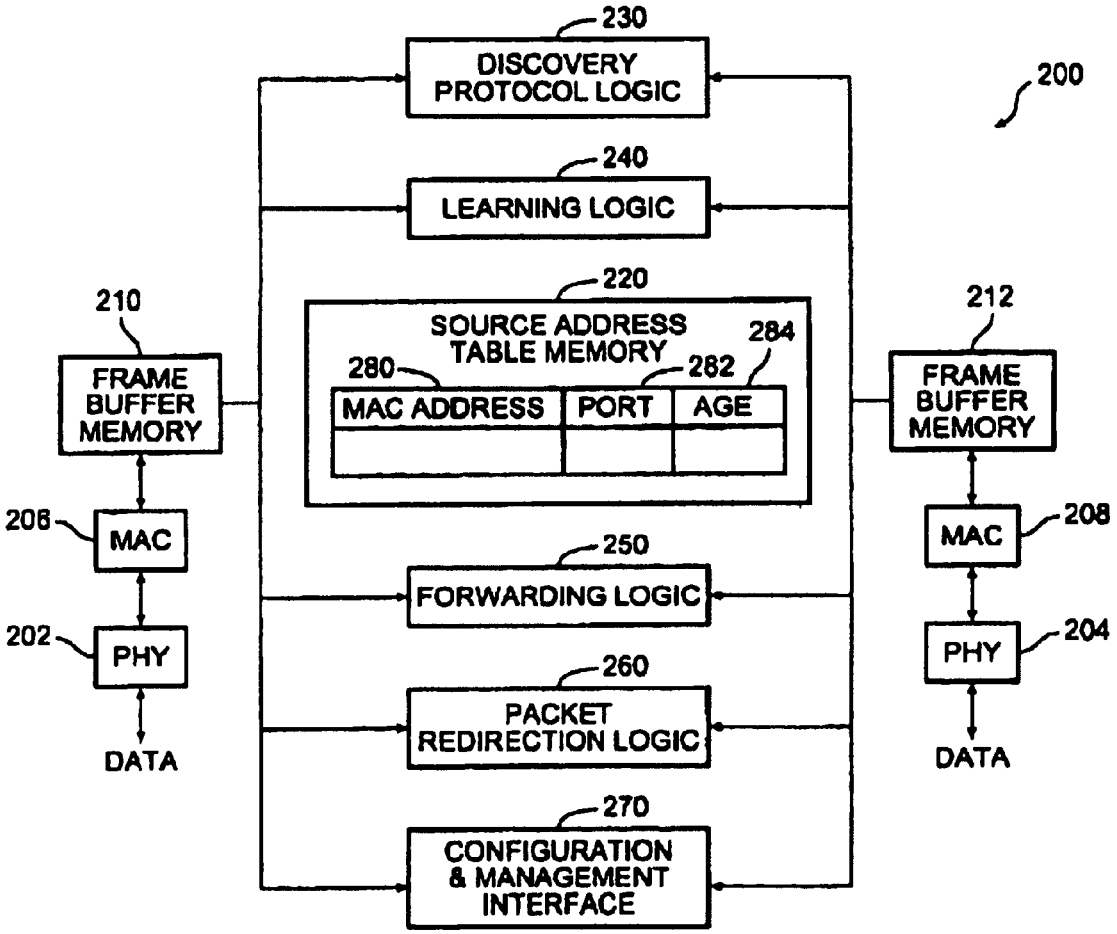
FIG. 2 is a block diagram of an Ethernet switch suitable for use with aspects of the present invention.

Referring now to FIG. 2, a block diagram of an Ethernet switch suitable for use with aspects of the present invention is shown. As shown in FIG. 2, Ethernet switch 200 includes a Layer 1 Physical Interface ("PHY") 202, 204, and a Layer 2 Media Access Control Interface ("MAC") 206, 208, for each port on the Ethernet switch 200. A network interface card ("NIC") consists of a MAC and a PHY. An Ethernet switch also contains a MAC and PHY on every port. Thus, an Ethernet switch may appear to a network as multiple NICs coupled together. Each switch PHY 202, 204, receives the incoming data bit stream and passes it to its corresponding MAC 206, 208, which reassembles the original Ethernet frames.

Ethernet switch 200 also includes a frame buffer memory 210, 212, for each port, a source address table memory 220, discovery protocol logic 230, learning logic 240, forwarding logic 250, packet redirection logic 260, and a configuration and management interface 270. During operation, the learning logic 240 will look at the source address ("SA") within a received Ethernet frame and populate the Source Address Table ("SAT") memory 220 with three columns: MAC address 280, port number 282, and age 284. The MAC address is the same as the source address that a sender has embedded into the frame. The age item will be a date stamp to indicate when the last frame was received from a particular MAC SA. In the example shown in FIG. 2, the port number may be 1 or 2. The SAT is also known as the Switch Forwarding Table ("SFT").

Forwarding logic 250 examines at the destination address ("DA") of a received Ethernet frame. This now becomes the new MAC address, which is then compared with the entries in the SAT. Four different forwarding options are possible. If the destination address is a specific address, known as a "broadcast" address, the frame is destined for all ports on the network. In this case, the Ethernet switch will forward the frame to all ports, except the one on which the frame was received. A broadcast address is six bytes with all ones, or "FF.FF.FF.FF.FF.FF" in hexadecimal notation. If the MAC address is found in the SAT and the corresponding port number is different from the received port, the frame is forwarded to that particular port number only. If the MAC address is found in the SAT and the port number is the same as the received port number, the frame is not forwarded;

instead, it is discarded. This is known as "filtering." The frame is discarded because the transmitting station and the receiving station are connected on the same shared LAN segment on that particular port and the receiver has already tuned into the frame. If the MAC address is not found in the table, the frame is forwarded to all ports. The reason a particular destination address is not present in the SAT table is that the receiving device could be new on the network, or the recipient has been very quiet (has not recently sent a frame). In both cases, the bridge SAT will not have a current entry. Flooding the frame on all ports is the brute way of ensuring that the frame is routed to its intended recipient.

Ethernet switch 200 uses the "age" entry in the SAT to determine whether that MAC address is still in use on the LAN. If the age has exceeded a certain preset value, the entry is removed. This conserves memory space and makes the bridge faster because fewer entries need to be scanned for address matching. Finally, the frame buffer memories 210, 212 will store frames on each port in case there is a backlog of frames to be forwarded.

According to embodiments of the present invention, discovery protocol logic 230 receives, processes, and sends Cisco™ Discovery Protocol ("CDP") or other discovery protocol packets to neighboring network devices on the network. Packet redirection logic 260 examines the source and destination addresses of Ethernet packets under control of the configuration and management interface 270 and forwards them to other network devices in a cluster configuration. As known to those skilled in the art, the program code corresponding to discovery protocol logic 230, learning logic 240, forwarding logic 250, packet redirection logic 260, configuration and management interface 270, and other necessary functions may all be stored on a computer-readable medium. Depending on each particular application, computer-readable media suitable for this purpose may include, without limitation, floppy diskettes, hard drives, RAM, ROM, EEPROM, nonvolatile RAM, or flash memory.

As is known to those skilled in the art, network devices, such as LAN switches, may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB. Embodiments of the present invention use in-band network management techniques.

Embodiments of the present invention can use the Internet Protocol or a proprietary Cluster Management Protocol ("CMP") (described in more detail in subsequent portions of this document) as the underlying mechanism to transport the SNMP configuration and management data. Without limitation, the protocols implemented in embodiments of the present invention include the Internet Protocol ("IP"), the Internet Control Message Protocol ("ICMP"), the User Datagram Protocol ("UDP"), the Trivial File Transfer Protocol ("TFTP"), the Bootstrap Protocol ("BOOTP"), and the Address Resolution Protocol ("ARP").

The MIB variables of network devices according to embodiments of the present invention are accessible through SNMP. As has been mentioned earlier, SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, an SNMP manager can get a value from an SNMP agent or store a value into that SNMP agent. The SNMP manager can be part of a network management system ("NMS"), and the SNMP agent can reside on a networking device such as a LAN switch. The device MIB files may be compiled with network management software, which then permits the SNMP agent to respond to MIB-related queries being sent by the NMS.

As has already been mentioned, an example of an NMS is the Cisco Works™ network management software, available from Cisco Systems, Inc. of San Jose, Calif. Cisco-Works™ uses the device MIB variables to set device variables and to poll devices on the network for specific information. Among other tasks, the Cisco Works™ software permits the results of a poll to be displayed as a graph and analyzed in order to troubleshoot internetworking problems, increase network performance, verify the configuration of devices, and monitor traffic loads. Other products known to those skilled in the art, available from several other vendors, provide similar functionality.

Figure 3A:
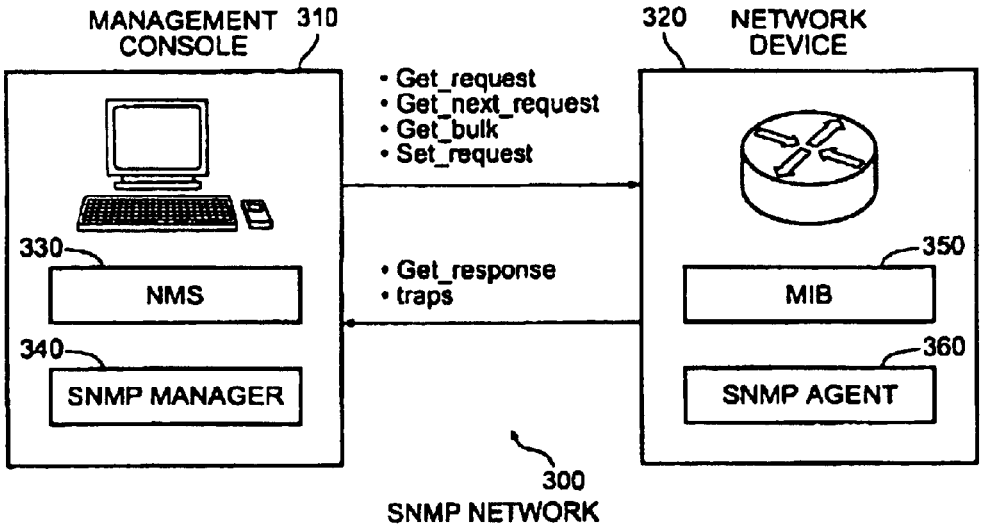
FIG. 3A is a block diagram illustrating an exemplary SNMP network suitable for use with aspects of the present invention.

Referring now to FIG. 3A, an exemplary SNMP network 300 is shown. The SNMP agent 360 in network device 320 gathers data from the MIB 350, also in network device 320. The MIB 350 is the repository for information about device parameters and network data. The SNMP agent 360 can send traps, or notification of certain events, to the SNMP manager 340, which is part of the Network Management Software ("NMS") 330 running on the management console 310. The SNMP manager 340 uses information in the MIB 350 to perform the operations described in Table 1, listed below.

TABLE 1

| Operation | Description |
|---|---|
| Get-request | Retrieve a value from a specific MTB variable. |
| Get-next-request | Retrieve a value from a variable within a table. With this operation, an SNMP manager does not need to know the exact variable name. A sequential search is performed to find the needed variable within a table. |
| Get-response | The reply to a get-request, get-next-request, and set-request sent by an NMS. |
| Set-request | Store a value in a specific variable. |
| trap | An unsolicited message sent by an SNMP agent to an SNMP manager indicating that some event has occurred. |

An SNMP community is a logical relationship between an SNMP agent and one or more SNMP managers. The community has a name (called a "community string"), and all members of a community have the same access privileges: either read-only (members can view configuration and performance information) or read-write (members can view configuration and performance information, and also change the configuration). As will be described in more detail in subsequent sections of this document, SNMP community strings are used to perform redirection of network management messages in one embodiment of the present invention.

All SNMP message exchanges consist of a community string and a data field, which contains the SNMP operation and its associated operands. An SNMP agent can be configured to receive requests and send responses only from managers that are members of a known community. If the agent knows the community string in the SNMP message and knows that the manager generating the request is a member of that community, it considers the message to be authentic and gives it the access allowed for members of that community. Thus, the SNMP community prevents unauthorized managers from viewing or changing the configuration of a network device. As will be discussed in more detail in subsequent sections of this document, embodiments of the present invention use the value of the SNMP community string to enable redirection of network management requests and responses within a cluster of network devices.

Community strings act as passwords for SNMP operations. Each network device has one or more community strings which define the ability of others to read and write the MIB of that device. As mentioned earlier, typically there are at least two community strings defined, one for read access and one for write access. A common default read community string is "public," but this string may be changed in networks more concerned with security.

SNMP network devices usually respond to SNMP requests when those requests include a valid community string. Devices that support directed community strings can be programmed to only respond to SNMP requests using a community string if the request is made from a particular IP address. Directed community strings provide an additional level of security, causing network devices to respond to SNMP requests only from certain management workstations/servers.

As is known to those skilled in the art, the SNMP model typically assumes that each managed network device is capable of running an SNMP agent internally. However, some devices, such as older devices which were not originally intended for use on a network, may not have this capability. To handle them, the SNMP protocol defines what is called an "SNMP proxy agent," namely an agent that watches over one or more non-SNMP devices and communicates with the management console on their behalf, typically communicating with the non-SNMP-devices themselves using some nonstandard or proprietary protocol. Typically, the SNMP proxy agent operates by translating the SNMP interactions it receives from the management console into whatever protocols are supported by the foreign device.

Figure 3B:
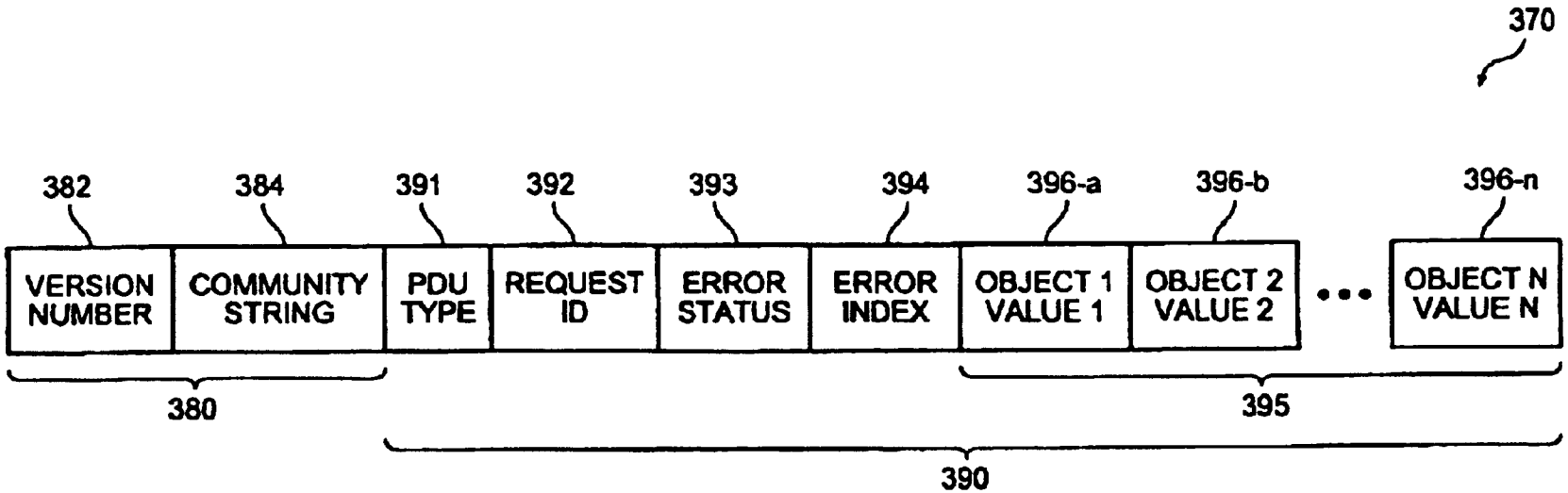
FIG. 3B is a block diagram illustrating an exemplary SNMP message format known to those skilled in the art.

FIG. 3B is a block diagram illustrating an exemplary SNMP message format known to those skilled in the art. FIG. 3B illustrates the message format for a version of SNMP known to those skilled in the art as "SNMPv1." Depending on the requirements of each particular implementation, embodiments of the present invention may be implemented using other versions of SNMP, or using versions of other network management protocols known to those skilled in the art.

As shown in FIG. 3B, SNMP message 370 comprises a message header 380 and a Protocol Data Unit ("PDU") 390. Message header 380 comprises a Version Number field 382 and a Community String 384. Version Number field 382 specifies the version of the SNMP protocol being used, while community string 384 defines an access environment for a group of network management stations/consoles ("NMSs"). NMSs within a community are said to exist within the same administrative domain. As is known to those skilled in the art, community strings serve as a weak form of authentication because devices that do not know the proper community name are precluded from SNMP operations.

Still referring to FIG. 3B, PDU 390 of SNMP message 370 comprises a PDU Type field 391, Request ID field 392, Error Status field 393, Error Index field 394, and a Variable Bindings field 395. As is known to those skilled in the art, PDU fields are variable in length. PDU Type field 391 specifies the type of PDU transmitted (e.g., Get, GetNext, Response, Set). Request ID field 392 associates a SNMP requests with the corresponding response. Error Status field 393 indicates one of a number of errors and error types. Only the response operation sets this field. Other operations set this field to zero. Error Index field 394 associates an error with a particular object instance (if there is an error, the error index is set to a non-zero error code). Variable Bindings field 395 serves as the data field of the SNMP PDUs. As is known to those skilled in the art, each variable binding 396a–396n associates a particular object instance with its current value (with the exception of Get and GetNext requests, for which the value is ignored). It should be noted that, as is known to those skilled in the art, SNMP also defines a PDU known as a "trap." Traps are not discussed herein, so as not to overcomplicate the present discussion.

NETWORK DEVICE CLUSTERS

Embodiments of the present invention support the following configuration and management interfaces: HTML (web-based) interfaces, SNMP, and a proprietary Internet Operating System ("IOS") command line interpreter ("CLI"). Each of these management interfaces can be used to monitor and configure a LAN switch or a group of switches, known as a cluster. The cluster management tools are web-based, and may be accessed via an ordinary browser, such as Netscape Navigator™ or Microsoft Internet Explorer™. Embedded HTTP server-based management tools using tools such as HTML code or Java™ Applets typically display images of network devices and graphical user interfaces.

Figure 4:
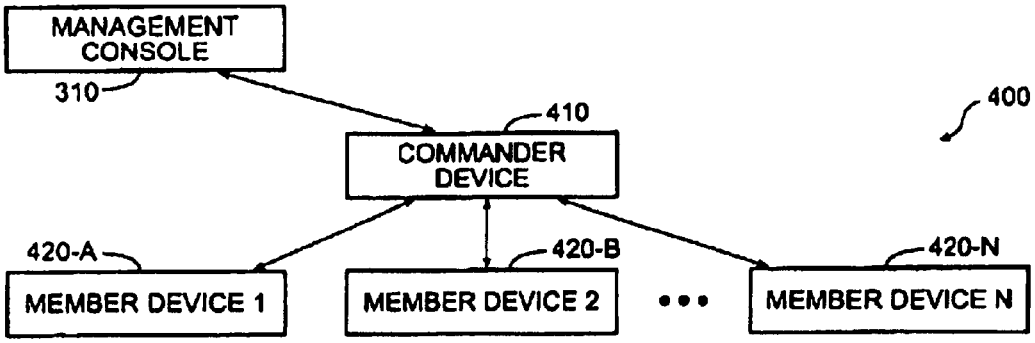
FIG. 4 is a block diagram illustrating a first cluster of network devices according to an aspect of the present invention.

When network devices are grouped into clusters, one device is called the commander device, and the other devices are called member devices. Referring now to FIG. 4, an exemplary network device cluster 400 is shown which includes a commander device 410 and one or more member devices 420-A–420-N. In the example shown in FIG. 4, according to the present invention, a single IP address for the entire cluster 400 is assigned to the commander device 410, which distributes configuration information and network management messages to the other devices in the cluster. In one embodiment, a cluster with up to fifteen member devices may be configured and managed via the IP address of the commander device 410. Network management messages How from management console 310 to and from commander device 410, which redirects network management request and response messages to and from the member devices 120-A–120-N, as will be explained in more detail in subsequent sections. It should be noted that the connections shown in FIG. 4 indicate the flow of network management message requests and responses, and do not necessarily correspond to the physical connections between the various devices shown in the figure. It should also be noted that according to aspects of the present invention, as will be discussed in more detail in subsequent portions of this document, multiple network management consoles for a given cluster or a given network device are supported.

Figure 5:
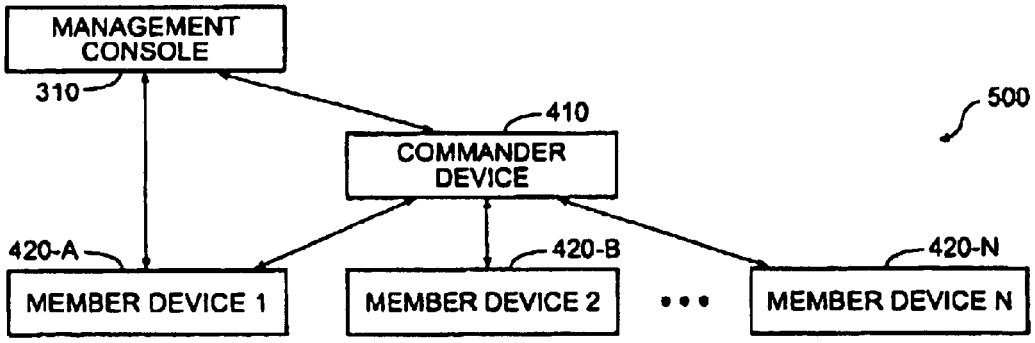
FIG. 5 is a block diagram illustrating a second cluster of network devices according to an aspect of the present invention.

As shown in FIG. 4, the member network devices 420-A–420-N in the cluster do not need individual IP addresses. However, it should be noted that nothing precludes a member device from being assigned its own IP address. If so desired in a particular implementation, one or more of the member devices may also be assigned its own IP address. Such a configuration is shown in FIG. 5. As shown in FIG. 5, in a network device cluster 500, in addition to commander device 410, member device 420-A has also been assigned its own IP address. In this case, in addition to the network management message flows described with respect to FIG. 4, network management message requests and responses can also flow directly to and from management console 310 and member device 420-A.

Figure 6:
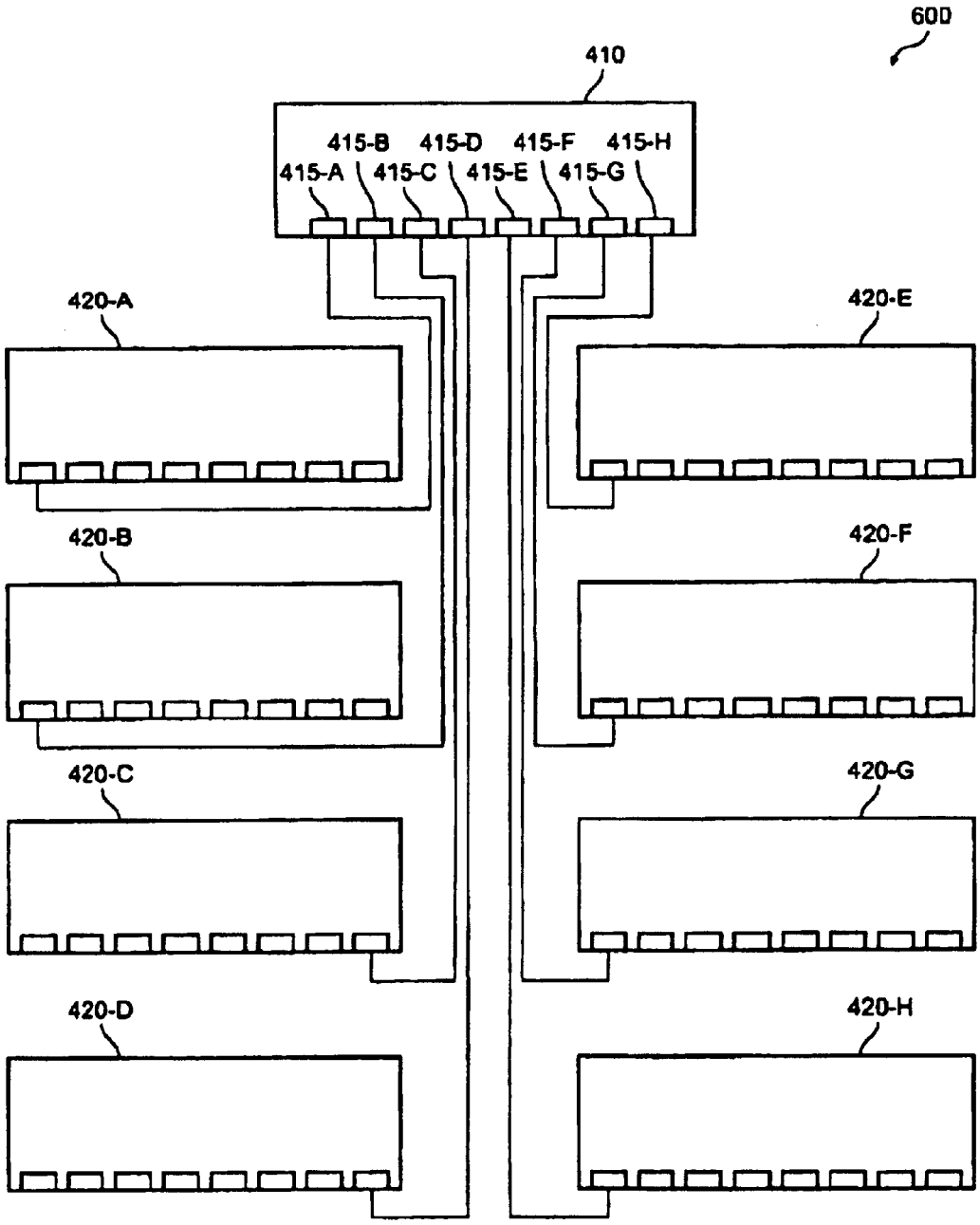
FIG. 6 is a block diagram illustrating a cluster of network devices in a star configuration according to an aspect of the present invention.

A cluster is a group of connected network devices that are managed as a single entity. The network devices can be in the same location, or they can be distributed across a network. According to embodiments of the present invention, network management communication with cluster devices is performed using a single IP address assigned to the commander device. Clusters may be configured in a variety of topologies. As an example, FIG. 6 illustrates a LAN switch cluster 600 configured in a "star," or "radial stack," topology. In this configuration, each of the eight member switches 420-A–420-H in cluster 600 is directly connected to one of the ports 415-A–415-H of commander switch 410. Many other cluster topologies are possible, including "daisy chain," or "hybrid" configurations. It is to be understood that many more cluster configurations are possible, and that the above examples are not in any way limiting.

In one embodiment, the commander device is the single point of access used to configure and monitor all the devices in a cluster, and member devices are managed through the commander device. The commander device is used to manage the cluster, and is managed directly by the network management station. Member devices operate under the control of the commander. While they are a part of a cluster, member devices are not managed directly. Rather, requests intended for a member device are first sent to the commander, then forwarded to the appropriate member device in the cluster. As noted earlier, however, a member device in a cluster may also be managed directly if it has been assigned its own IP address.

When devices are first installed, they are cabled together according to the network configuration desired for a particular application, and an IP address is assigned to the commander device. In addition, the commander device must be enabled as the commander device of the cluster. Once the commander device has been enabled, it can use information known about the network topology to identify other network devices in the network that may be added to the cluster. According to one embodiment of the present invention, the commander device uses the Cisco™ Discovery Protocol ("CDP") to automatically identify candidate network devices. However, other similar products known to those of ordinary skill in the art are available from other vendors to accomplish the same task. Alternatively, discovery of candidate network devices may be performed manually by inspecting the network topology and the network devices attached to the network.

CDP is a media-independent device discovery protocol which can be used by a network administrator to view information about other network devices directly attached to a particular network device. In addition, network management applications can retrieve the device type and SNMP-agent address of neighboring network devices. This enables applications to send SNMP queries to neighboring devices. CDP thus allows network management applications to discover devices that are neighbors of already known devices, such as neighbors running lower-layer, transparent protocols.

It is to be understood that the present invention is not limited to devices that are compatible with CDP. CDP runs on all media that support the Subnetwork Access Protocol ("SNAP"), including LAN and Frame Relay. CDP runs over the data link layer only. Each network device sends periodic messages to a multicast address and listens to the periodic messages sent by others in order to learn about neighboring devices and determine when their interfaces to the media go up or down. Each device also advertises at least one address at which it can receive SNMP messages. The advertisements contain holdtime information, which indicates the period of time a receiving device should hold CDP information from a neighbor before discarding it. With CDP, network management applications can learn the device type and the SNMP agent address of neighboring devices. This process enables applications to send SNMP queries to neighboring devices.

Once a network device cluster is formed, any of the devices in the cluster may be accessed by entering the IP address of the commander device into a Web browser. The single password that is entered to log in to the commander device also grants access to all the member devices in the cluster.

In one embodiment, there can be a maximum of sixteen devices in a cluster: fifteen member devices and one commander device. If passwords are defined for the candidate member devices, the network administrator must know them all before they can be added to the cluster. In addition, a candidate device according to embodiments of the present invention must not already be a member device or a commander device of another active cluster. Each member device is given a unique member number within the cluster by the user when it joins the cluster. This number is used to identify the different member devices of the cluster. The commander device is assigned member number ZERO by default, but it can be assigned any other appropriate number or other identifier if so desired in a particular implementation. In this embodiment, the only devices eligible to become member devices are devices that are one CDP hop away from the current cluster (as defined by the commander device and the current set of member devices) and which support the cluster software requirements. These devices are called candidate devices.

If the commander device of a cluster fails, member devices continue forwarding but cannot be managed through the commander device. Member devices retain the ability to be managed through normal standalone means, such as the console-port CLI, and they can be managed through SNMP, HTML, and Telnet after they have been assigned an IP address. Recovery from a failed commander device can be accomplished by replacing the failed unit with a cluster member or another network device. To have a cluster member ready to replace the commander device, the network administrator must assign an IP address to another cluster member, and know the command-device enable password for that device.

According to embodiments of the present invention, when a cluster of LAN switches is formed, the commander switch automatically changes three parameters on all the member switches in the cluster: the IOS host name, the enable password, and the. SNMP community string. If a switch has not been assigned an IOS host name, the commander switch appends a number to the name of the commander switch and assigns it sequentially to the member switches. For example, a commander switch named eng-cluster could name a cluster member switch eng-cluster-5. If an IOS host name has already been assigned to a switch, the switch retains its IOS host name.

Figure 7:
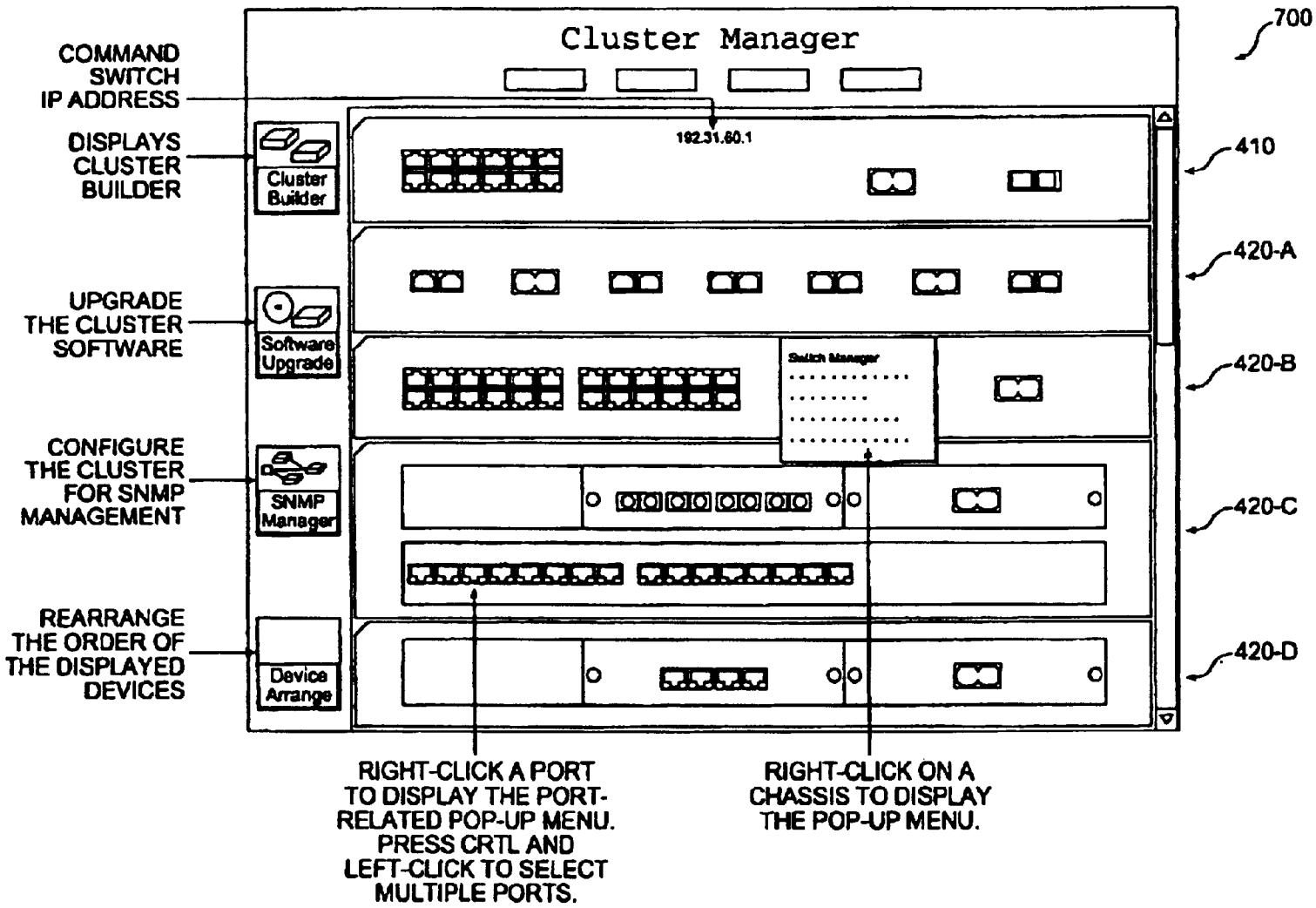
FIG. 7 is a sample configuration display screen for a switch cluster according to aspects of the present invention.

Once a cluster of network devices, such as a cluster of LAN switches, has been created, network management software such as the Cluster Manager™ program, available from Cisco Systems, Inc. of San Jose, Calif., may be used to monitor and configure the switches in the cluster. FIG. 7 illustrates a switch cluster with one commander switch 410 and four member switches 420-A–420-D as it is displayed on a sample Cluster Manager™ display screen 700.

Thus, one advantage of the present invention is that a network administrator need set only one IP address, one password, and one system SNMP configuration in order to manage an entire cluster of switches. A cluster can be formed from switches located in several different buildings on a campus, and may be linked by fiber optic, Fast Ethernet, or Gigabit Ethernet connections.

Clusters may be managed from a management station through ASCII terminal consoles, telnet sessions, SNMP management stations and Web Consoles. All configuration and management requests are first directed to the cluster commander. Any required authentication is done by the commander. If necessary, the commander acts as a redirector and forwards requests to the appropriate member switch and forwards the reply to the management station. According to embodiments of the present invention, a member switch can be in only one cluster at a time and can have only one commander. There is no restriction on the type of connections between a commander switch and member switches. In one embodiment of the present invention, a cluster can be formed for a fully interconnected group of CDP neighbors. A network device can join a cluster when the network device is a CDP neighbor of the cluster.

The primary external configuration and management interface to the cluster is a TCP/IP connection to the commander switch. HTTP, SNMP, and telnet protocols run on top of the IP stack in the operating system. Alternatively, the cluster may also be managed via the console port of the commander.

According to embodiments of the present invention, SNMP redirection allows a commander switch to act similarly to an SNMP proxy for the entire cluster. An SNMP request is received by the commander and, depending on whether the request is intended to be processed by the commander switch or a member switch, it is either processed on the commander or redirected to a member switch. If an SNMP request is redirected to a member switch, the response is also redirected back to the original requester.

Figure 8:
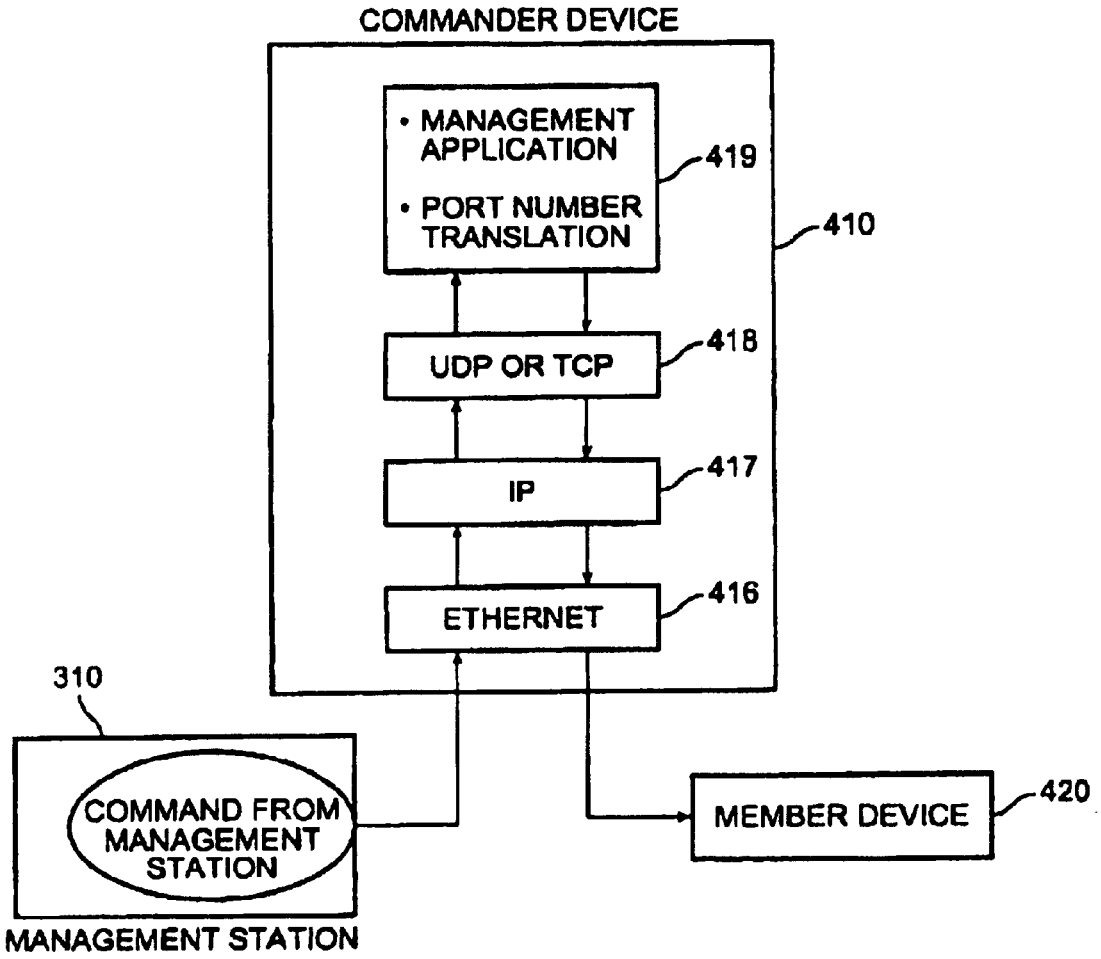
FIG. 8 is a block diagram of network management data packet processing by a commander device according to an aspect of the present invention.

FIG. 8 illustrates in block diagram form how a packet intended for a member switch is processed by the commander. As shown in FIG. 8, a network management data packet such as an SNMP request from the management station 310 is received by the Ethernet module 416 of the commander switch 410. The request is processed at IP layer 417, UDP or TCP layer 418, and Management Application layer 419 of the commander switch 410. The Management Application layer 419 determines that the command is intended for member switch 420, and performs redirection by translating the port number in the received command to the appropriate port for member switch 420. The redirected command flows down through the UDP or TCP layer 418, the IP layer 417, and the Ethernet layer 416 of the commander switch 410, and is passed on via Ethernet to the member switch 420. The commander switch 410 identifies each member switch 420-A–420-N by the MAC address of the port on the member switch that is connected to the commander 410.

The commander switch 410 manages SNMP communication for all switches in the cluster. The commander switch 410 forwards the set and get requests from SNMP applications to member switches 420-A–420-N, and it forwards traps and other responses from the member switches 420-A–420-N back to the management station 310. In one embodiment of the present invention, as will be explained more fully below, read-write and read-only community strings are established for an entire cluster. In this embodiment, the commander switch appends a string (which may contain numbers) to the community strings of member switches so that these modified community strings can provide authentication for the member switches. When a new switch is added to the cluster, a community string is created for it based on the community string for the cluster. Only the first read-only and read-write community strings are propagated to the cluster.

Figure 9:
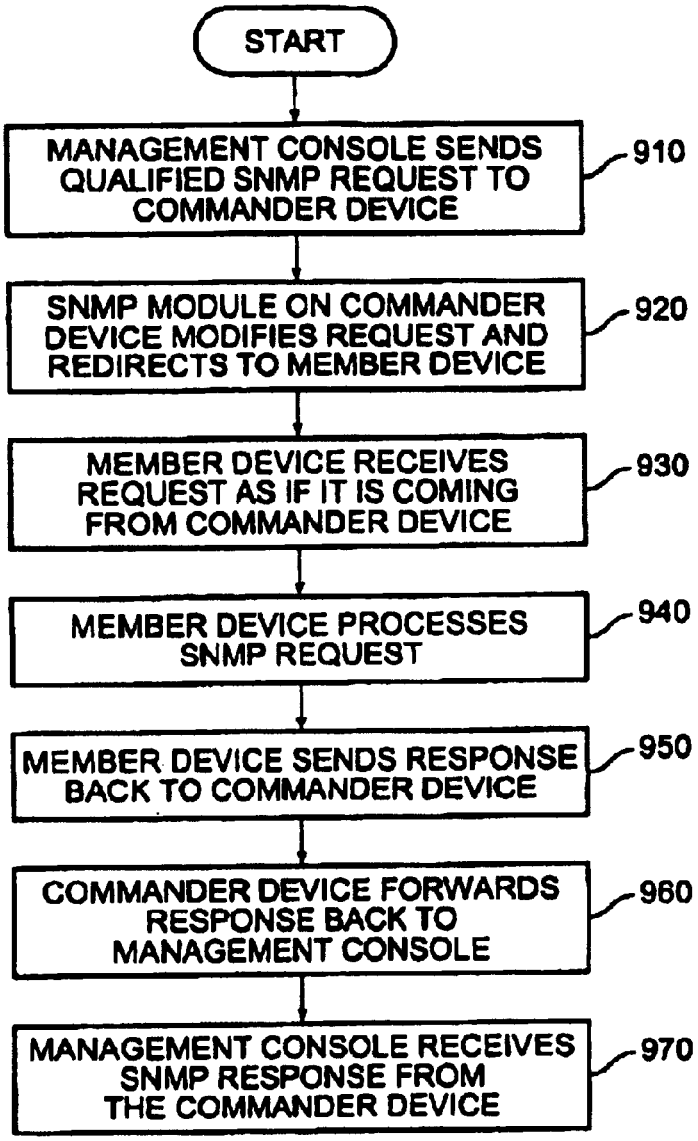
FIG. 9 is a flow diagram illustrating the process of network management message redirection according to one embodiment of the present invention.

FIG. 9 is a flow diagram illustrating the process of network management message redirection according to one embodiment of the present invention. As shown in FIG. 9, at step 910, a qualified SNMP request intended for processing by a member switch is sent from the management console to the commander device. To address a member of the cluster, the management console appends a string unique to the member to the end of the community string in the SNMP request using a "@" character to delimit the end of the community string and the start of the unique member string. For example, in one embodiment, "public@es1" would be the community string used by the management console to address member 1. As is known to those skilled in the art, in SNMP terminology, a community string with an "@" delimiter is referred to as a composite community string. Embodiments of the present invention thus use composite community strings to facilitate redirection of network management requests and responses.

At step 920, the commander device examines the community strings in SNMP requests to determine when it should dispatch an SNMP request to another device. When it is determined that an SNMP request should be dispatched to another device, the SNMP request is transmitted over the network to the member device, using the Cluster Management Protocol ("CMP") transport method which will be described later in this document with reference to FIG. 10. If a network device has been configured with an IP address, IP can also be used as the transport method.

Still referring to step 920 as shown in FIG. 9, before the SNMP request is forwarded to the member device, the request's source address information and its SNMP request-ID are saved by the commander device. As is known to those skilled in the art, most SNMP request and response messages (with the exception of traps) contain a request-ID field so that responses can be matched up with the appropriate requests. The source address is replaced by an IP or CMP address that is an address of the commander device. The SNMP request-ID field is replaced by a pseudo-unique request-ID that is specific to the commander device and to the specific member device for whom the request is destined. In the context of the present invention, this pseudo-unique request-ID is known as the intracluster request identifier.

This novel use of the request-ID field allows multiple requests to be outstanding between the commander device and the member device. It should be noted that this novel use of the request-ID field enables a cluster configuration with multiple network management consoles per cluster or per network device. Finally, the destination address of the SNMP request is replaced by the IP or CMP network address of the member device being addressed. At this point, the commander device then transmits the SNMP request to the appropriate member device.

At step 930, the appropriate member device receives the SNMP request. This SNMP request will appear to the member device to be a normal SNMP request that originated from a network management station ("NMS"). At step 940, the member device processes the SNMP request in the normal manner.

Because the source address of the SNMP request is the address of the commander device, at step 950, the SNMP response will be sent to the commander device. The SNMP response received from the member device will also have a copy of the same SNMP request-ID that was in the original SNMP request that was forwarded from the commander device to the member device.

At step 960, when the commander device receives the SNMP response, it uses the received request-ID combined with the member device source address in the message to look up the source network management station address and the original request-ID in a table. The destination address of the SNMP response and the request-ID of the SNMP response are replaced by the network management station address and the request-ID that had been saved in step 920. The source address of the SNMP response is replaced by the address of the commander device, and the SNMP response is transmitted to the management console. Finally, at step 970, the management console receives the forwarded response from the commander device.

As mentioned earlier, embodiments of the present invention may use the Internet Protocol ("IP") or a proprietary Cluster Management Protocol ("CMP") as the transport mechanism used to communicate between the commander switch and member switches in a cluster. To distinguish between normal IP packets and the cluster management IP packets, a special Subnetwork Access Protocol ("SNAP") header is used for the cluster management IP packets. In one embodiment of the present invention, private IP addresses ("10.x.y.z") are used for intracluster communication. Each cluster member, including the commander, is assigned a private IP address, known as the cluster IP address, or CMP address. These private IP addresses are maintained internally by the commander.

As described below, when a member switch is added to a cluster, the commander generates a unique cluster IP address and assigns it to the member switch. The commander's cluster IP address is also passed to the member switch. These cluster IP addresses are dynamically assigned. When the commander finds a conflict with one of the assigned cluster IP addresses (such as when some other IP station, not part of the cluster, is using the same IP address as one of the cluster IP addresses), then the commander resolves the conflict by selecting another cluster IP address and assigning it to the corresponding member switch.

In one embodiment of the present invention, both the commander switch and the member switches use CMP addresses to send and receive management data within the cluster. A CMP address is a private IP address in "10.x.y.z" format, where x, y, and z, are integers between 0 and 255. The commander switch automatically generates a CMP address and assigns it to the member switch when the switch first joins the cluster.

Since CMP addresses are automatically generated, there can be conflicts between the IP address used by a cluster network device and the IP address of a network device outside the cluster. For example, some other IP station can be using the same address as an automatically assigned CMP address. Thus, both the commander switch and the member switches constantly check for conflicts, a new CMP address is generated if a conflict is detected.

The commander switch assigns the CMP address to the member switch using the CMP/RARP protocol. CMP/RARP is a variation of the normal RARP (Reverse ARP) protocol. As described below, CMP/RARP uses a different SNAP encapsulation, and it has provisions to carry variable list of cluster parameters as Type Length Value ("TLV") fields.

Figure 10:
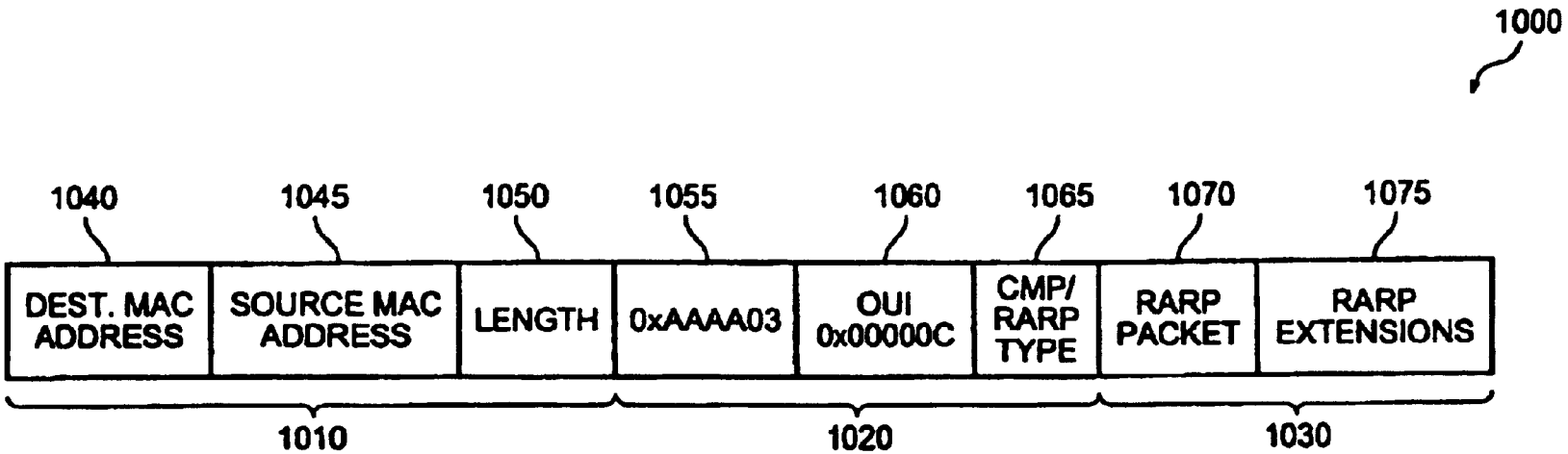
FIG. 10 is a block diagram illustrating the intracluster packet format according to aspects of the present invention.

FIG. 10 is a block diagram illustrating the intracluster packet format according to aspects of the present invention. As shown in FIG. 10, a CMP/RARP packet 1000 comprises an Ethernet header 1010, a LLC/SNAP header 1020, and a RARP portion 1030. As known to those skilled in the art, Ethernet header 1010 comprises a 6-byte destination MAC address 1040, a 6-byte source MAC address 1045, and a 2-byte Length field 1050. LLC/SNAP header 1020 comprises a 3-byte header field 1055 (set to equal 0×AA-AA-03 in one embodiment), a 3-byte OUI field 1060 (set to equal 0×00-00-0C in one embodiment), and a 2-byte CMP/RARP identifier field 1065 (set to equal 0×0114 in one embodiment). RARP portion 1030 of the CMP/RARP packet 1000 comprises a 28-byte RARP packet 1070, described below, and a variable length CMP/RARP extension field 1075.

As shown in FIG. 10, CMP/RARP packets 1000 use a separate SNAP encapsulation 1020 to distinguish them from normal RARP packets. Also, it should be noted that at the end of the CMP/RARP packet, there is a variable length extension field 1075 to pass cluster parameters according to aspects of the present invention.

Figure 11:
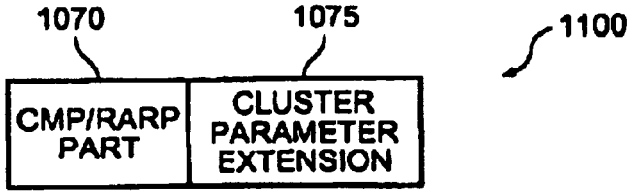
FIG. 11 is a block diagram illustrating a cluster ADD message format according to aspects of the present invention.

FIG. 11 is a block diagram illustrating a cluster ADD message format according to aspects of the present invention. As shown in FIG. 11, a cluster ADD message 1100 is one specific example of a type of cluster message that may be transmitted in the RARP portion 1030 of the CMP/RARP packet 1000 shown in FIG. 10. Referring back to FIG. 11, cluster ADD message 1100 comprises a 28-byte CMP/RARP part 1070 and a variable length cluster parameter extension part 1075. CMP/RARP part 1070 is used for assigning a CMP address to a cluster member switch, while the cluster parameter extension part 1075 is used to transmit cluster parameters to a member switch. Cluster ADD message 1100 is sent to a member switch when the member switch first joins a cluster.

Figure 12A:
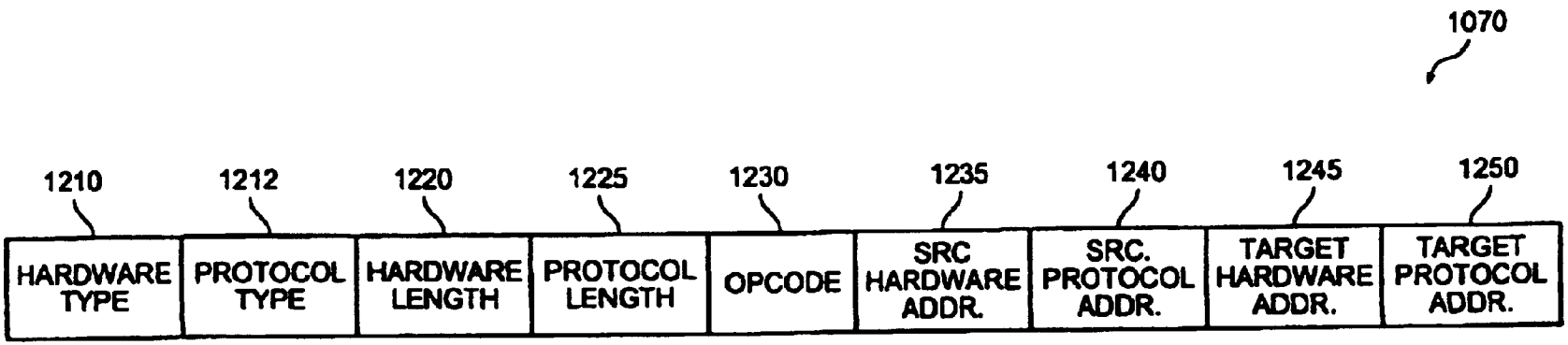
FIG. 12A is a block diagram illustrating the format of the CMP/RARP portion of a cluster ADD message according to aspects of the present invention.

FIG. 12A is a block diagram illustrating the format of the CMP/RARP portion 1070 of a cluster ADD message 1100 according to aspects of the present invention. As shown in FIG. 12, the CMP/RARP portion 1070 has the same format as a regular RARP packet, and comprises a 2-byte Hardware type field 1210 (set to equal 0×0001, i.e., "Ethernet type," in one embodiment), a 2-byte protocol field 1215 (set to equal 0×0800, i.e., "IP type," in one embodiment), a 1-byte hardware length field 1220 (set to equal "6," i.e., "Ethernet type," in one embodiment), a 1-byte protocol length field 1225 (set to equal "4," i.e., "IP type," in one embodiment), a 2-byte opcode field 1230 (set to equal 0×04, i.e., "RARP reply," in one embodiment), a 6-byte source hardware address field 1235 (which equals the MAC address of the cluster commander switch), a 4-byte source protocol address field 1240 (which equals the CMP address of the commander switch), a 6-byte target hardware address field 1245 (which equals the MAC address of the member switch), and a 4-byte target protocol address field 1250 (which equals the CMP address of the member switch).

Figure 12B:
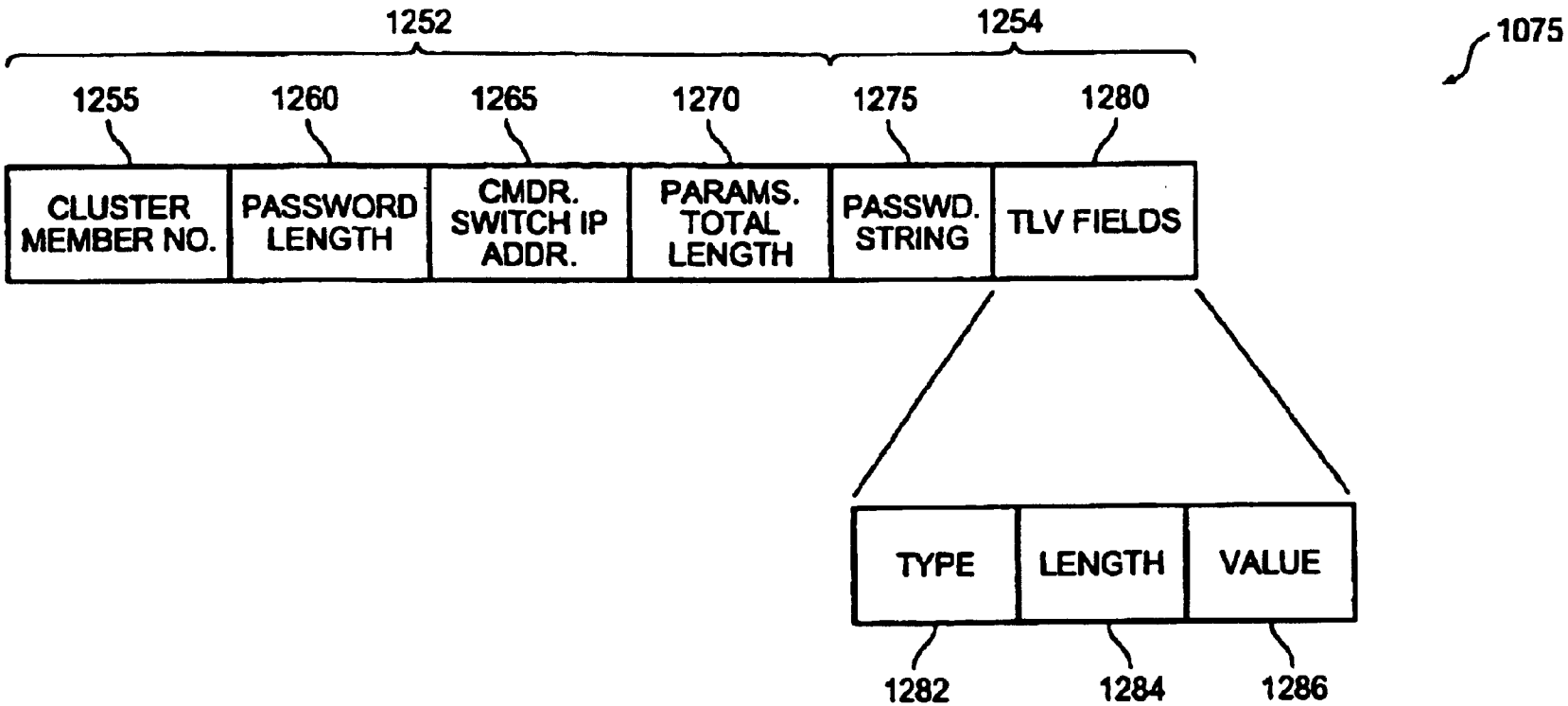
FIG. 12B is a block diagram illustrating the format of the cluster parameter extension portion of a cluster ADD message according to aspects of the present invention.

FIG. 12B is a block diagram illustrating the format of the cluster parameter extension portion 1075 of a cluster ADD message 1100 according to aspects of the present invention. The cluster parameter extension portion 1075 of a cluster ADD message 1100 is used to set cluster parameters on a member switch. As shown in FIG. 12B, cluster parameter extension portion 1075 comprises a fixed length portion 1252 and a variable length portion 1254. The fixed length portion 1252 comprises a 2-byte cluster member number field 1255, a 2-byte password length field 1260, a 4-byte command switch management IP address field 1265, and a 4-byte total parameter length field 1270. The variable length portion 1254 comprises a variable length password string field 1275 for authentication, and a variable length list of cluster parameter Type Value Fields ("TLVs") 1280. Each cluster parameter TLV 1280 further comprises a 1-byte cluster parameter type field 1282, a 1-byte cluster parameter length field 1284, and a variable length (up to 255-bytes) cluster parameter value field 1286.

The present invention thus enables the transparent management of multiple network devices as a single entity, and allows a cluster having multiple network devices to share a single IP network address. The present invention also allows the use of the standard set of SNMP managed objects without changing the protocol from the point of view of the network management station or the member devices. Finally, since the dispatch of the SNMP request to the member devices is performed using composite community strings in one embodiment, the number of devices that can be addressed is unbounded.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for managing a cluster of network devices, comprising:

selecting a plurality of network devices to form a cluster, each of the network devices being capable of interfacing at least two computer networks, and capable of receiving and processing a network management request message from a management console, each of the network devices being assigned with an intra-cluster identifier;

selecting a first network device from among the plurality of the network devices to be a commander network device, the commander network device having a public IP address, each of the remaining network devices being a cluster member network device, each cluster member network device having a non-public network address;

receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and forwarding the network management request message to the cluster member network device identified by the intra-cluster identifier using the non-pubic network address of the cluster member network device.

2. The method according to claim 1 wherein said forwarding includes:

changing the source address field of the network management request message to contain the IP address of the commander network device; and changing the destination address field of the network management request message to contain the non-public network address of the cluster member network device.

3. The method according to claim 2 wherein said forwarding further includes:

changing the request identification field of the network management request message to contain an intra-cluster request identifier.

4. The method according to claim 3, further comprising:

storing values of the source address field and the request identification field within the commander network device.

5. The method according to claim 3, further comprising:

receiving a response to the network management request message at the commander network device from the cluster member network device, wherein the response includes a source address field containing the non-public network address of the cluster member network device, a destination address field containing the IP address of the commander network device, and a response identification field containing the value of the intra-cluster request identifier;

changing the source address field of the response to contain the IP address of the commander network device;

changing the destination address field of the response to contain the IP address of the management console;

changing the response identification field of the response to contain the original request identifier; and forwarding the response to the management console.

6. The method according to claim 2, further comprising:

receiving a response to the network management request message at the commander network device from the cluster member network device, wherein the response to the network management request message includes a source address field containing the non-public network address of the cluster member network device, and a destination address field containing the IP address of the commander network device;

changing the source address field of the response to the network management request message to contain the IP address of the commander network device;

changing the destination address field of the response to the network management request message to contain the IP address of the management console; and forwarding the response to the network management request message to the management console.

7. The method according to claim 6, wherein the network management request message and the response to the network management request message are SNMP messages.

8. The method according to claim 1, wherein the first network device is a LAN switch.

9. The method according to claim 8, wherein the cluster member network device is a LAN switch.

10. The method according to claim 1 wherein said selecting a cluster includes:

defining a cluster identifier for the cluster.

11. The method according to claim 10 wherein the cluster identifier is an SNMP community string, and wherein the intra-cluster identifier includes the SNMP community string and a unique member string.

12. The method according to claim 1, wherein the network management request message is an SNMP message.

13. The method according to claim 1 wherein the non-public network address of the cluster member network device is a non-public IP address.

14. The method according to claim 1 wherein the non-public network address of the cluster member network device is a Media Access Control address.

15. An apparatus for managing a cluster of network devices, comprising:

means for selecting a plurality of network devices to form a cluster, each of the network devices being capable of interfacing at least two computer networks, and capable of receiving and processing a network management request message from a management console, each of the network devices being assigned with an intra-cluster identifier;

means for selecting a first network device from among the plurality of the network devices to be a commander network device, the commander network device having a public IP address, each of the remaining network devices being a cluster member network device, each cluster member network device having a non-public network address;

means for receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and means for forwarding the network management request message to the cluster member network device identified by the intra-cluster identifier using the non-pubic IP address of the cluster member network device.

16. The apparatus according to claim 15 wherein said means for forwarding includes:

means for changing the source address field of the network management request message to contain the IP address of the commander network device; and means for changing the destination address field of the network management request message to contain the non-public network address of the cluster member network device.

17. The apparatus according to claim 16 wherein said means for forwarding further includes:

means for changing the request identification field of the network management request message to contain an intra-cluster request identifier.

18. The apparatus according to claim 17, further comprising:

means for storing values of the source address field and the request identification field within the first network device.

19. The apparatus according to claim 17, further comprising:

means for receiving a response to the network management request message at the commander network device from the cluster member network device, wherein the response includes a source address field containing the non-public network address of the cluster member network device, a destination address field containing the IP address of the commander network device, and a response identification field containing the value of the intra-cluster request identifier;

means for changing the source address field of the response to contain the IP address of the commander network device;

means for changing the destination address field of the response to contain the IP address of the management console;

means for changing the response identification field of the response to contain the original request identifier; and means for forwarding the response to the management console.

20. The apparatus according to claim 16, further comprising:

means for receiving a response to the network management request message at the commander network device from the cluster member network device, wherein the response to the network management request message includes a source address field containing the non-public network address of the cluster member network device, and a destination address field containing the IP address of the commander network device;

means for changing the source address field of the response to the network management request message to contain the IP address of the commander network device;

means for changing the destination address field of the response to the network management request message to contain the IP address of the management console; and means for forwarding the response to the network management request message to the management console.

21. The apparatus according to claim 20, wherein the network management request message and the response to the network management request message are SNMP messages.

22. The apparatus according to claim 15, wherein the first network device is a LAN switch.

23. The apparatus according to claim 22, wherein the cluster member network device is a LAN switch.

24. The apparatus according to claim 15 wherein said means for selecting a cluster includes:

means for defining a cluster identifier for the cluster.

25. The apparatus according to claim 18 wherein the cluster identifier is an SNMP community string, and wherein the intra-cluster identifier includes the SNMP community string and a unique member string.

26. The apparatus according to claim 15, wherein the network management request message is an SNMP message.

27. The apparatus according to claim 15 wherein the non-public network address of the cluster member network device is a non-public IP address.

28. The apparatus according to claim 15 wherein the non-public network address of the cluster member network device is a Media Access Control address.

29. A first network device for redirecting network management messages in a cluster of network devices, the cluster including a plurality of network devices, each of the network devices being capable of interfacing at least two computer networks, and capable of receiving and processing a network management request message from a management console, each of the network devices being assigned with an intra-cluster identifier, said first network device comprising:

a public IP address, said first network device being selected from among the plurality of the network devices, each of the remaining network devices being a cluster member network device, each cluster member network device having a non-public network address;

network management request reception logic adapted to receive a network management request message from a management console, wherein the network management request message includes a source address field containing an IP address of the management console, a destination address field containing the IP address of the first network device, a request identification field containing an original request identifier uniquely identifying the network management request message, and an indication of an intra-cluster identifier; and logic circuitry adapted to forward for the network management request message to the cluster member network device identified by the intra-cluster identifier using the non-pubic network address of the cluster member network device.

30. The first network device in accordance with claim 29 wherein said logic circuitry adapted to forward includes:

logic circuitry adapted to change the source address field of the network management request message to contain the IP address of the first network device; and logic circuitry adapted to change the destination address field of the network management request message to contain the non-public network address of the cluster member network device.

31. The first network device in accordance with claim 30 wherein said logic circuitry adapted to forward further includes:

logic circuitry adapted to change the request identification field of the network management request message to contain an intra-cluster request identifier.

32. The first network device in accordance with claim 31, further comprising:

a memory for storing values of the source address field and the request identification field within the first network device.

33. The first network device in accordance with claim 31, further comprising:

logic circuitry adapted to receive a response to the network management request message at the first network device from the cluster member network device, wherein the response includes a source address field containing the non-public network address of the cluster member network device, a destination address field containing the IP address of the first network device, and a response identification field containing the value of the intra-cluster request identifier;

logic circuitry adapted to change the source address field of the response to contain the IP address of the first network device;

logic circuitry adapted to change the destination address field of the response to contain the IP address of the management console;

logic circuitry adapted to change the response identification field of the response to contain the original request identifier; and logic circuitry adapted to forward the response to the management console.

34. The first network device in accordance with claim 30, further comprising:

logic circuitry adapted to receive a response to the network management request message from the cluster member network device, wherein the response to the network management request message includes a source address field containing the non-public network address of the cluster member network device, and a destination address field containing the IP address of the first network device;

logic circuitry adapted to change the source address field of the response to the network management request message to contain the IP address of the first network device;

logic circuitry adapted to change the destination address field of the response to the network management request message to contain the IP address of the management console; and logic circuitry adapted to forward the response to the network management request message to the management console.

35. The first network device in accordance with claim 34, wherein the network management request message and the response to the network management request message are SNMP messages.

36. The first network device in accordance with claim 29, wherein the first network device is a LAN switch.

37. The first network device in accordance with claim 36, wherein the cluster member network device is a LAN switch.

38. The first network device in accordance with claim 29, wherein the network management request message is an SNMP message.

39. The first network device in accordance with claim 29 wherein the intra-cluster identifier includes an SNMP community string defined for the cluster and a member string uniquely identifying the network device within the cluster.

40. The first network device in accordance with claim 29 wherein the non-public network address of the cluster member network device is a non-public IP address.

41. The first network device in accordance with claim 29 wherein the non-public network address of the cluster member network device is a Media Access Control address.

42. A cluster of network devices, comprising:

a cluster management console capable of transmitting a network management request message; and at least two network devices capable of interfacing at least two computer networks, and capable of receiving and processing the network management request message, each of the network devices being assigned with a unique intra-cluster identifier, said network devices including:

a commander network device having a public IP address and receiving the network management request, the network management request including a source address field containing an IP address of said management console, a destination address field containing the IP address of said commander network device, a request identification field containing an original request identifier uniquely identifying the network management request message, and an indication of an intra-cluster identifier; and at least one cluster member network device, each cluster member network device having a non-public network address, wherein said commander network device forwards the network management request to the cluster member network device identified by the intra-cluster identifier using the non-pubic network address of the cluster member network device.

43. The cluster of network devices according to claim 42, wherein said commander network device is a LAN switch.

44. The cluster of network devices according to claim 43, wherein said cluster member network devices are LAN switches.

45. The cluster of network devices according to claim 44, wherein said network devices in the cluster transmit data to other network devices to discover whether additional network devices may be added to the cluster.

46. The cluster of network devices according to claim 42, wherein said commander network device forwards the network management request by replacing the IP address of the commander network device in the destination address field with the non-public network address of the cluster member network device.

47. The cluster of network devices according to claim 46, wherein said, network devices in the cluster transmit data to other network devices to discover whether additional network devices may be added to the cluster.

48. The cluster of network devices according to claim 42, wherein said network devices in the cluster transmit data to other network devices to discover whether additional network devices may be added to the cluster.

49. A program storage device readable by a machine, tangibly embodying a program of instructions executable by the machine to perform a method for managing a cluster of network devices, the method comprising:

selecting a plurality of network devices to form a cluster, each of the network devices being capable of interfacing at least two computer networks, and capable of receiving and processing a network management request message from a management console, each of the network devices being assigned with an intra-cluster identifier;

selecting a first network device from among the plurality of the network devices to be a commander network device, the commander network device having a public IP address, each of the remaining network devices being a cluster member network device, each cluster member network device having a non-public network address;

receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and forwarding the network management request message to the cluster member network device identified by the intra-cluster identifier using the non-pubic network address of the cluster member network device.

50. The program storage device readable by a machine according to claim 49 wherein said forwarding includes:

changing the source address field of the network management request message to contain the IP address of the commander network device; and changing the destination address field of the network management request message to contain the non-public network address of the cluster member network device.

51. The program storage device readable by a machine according to claim 50, the method further comprising:

receiving a response to the network management request message at the commander network device from the cluster member network device, wherein the; response to the network management request message includes a source address field containing the non-public network address of the cluster member network device, and a destination address field containing the IP address of the commander network device;

changing the source address field of the response to the network management request message to contain the IP address of the commander network device;

changing the destination address field of the response to the network management request message to contain the IP address of the management console; and forwarding the response to the network management request message to the management console.

52. The cluster of network devices according to claim 42 wherein the non-public network address of the cluster member network device is a non-public IP address.

53. The cluster of network devices according to claim 42 wherein the non-public network address of the cluster member network device is a Media Access Control address.

*54. A method for managing a cluster of network devices, comprising:*

*identifying a plurality of network devices to form a cluster, each of the network devices being capable of interfacing at least two computer networks, and capable of receiving and processing a network management request message from a management console, each of the network devices being assigned with an intra-cluster identifier;*

*identifying a first network device from among the plurality of the network devices to be a commander network device, the commander network device having a public IP address, each of the remaining network devices being a cluster member network device, each cluster member network device having a non-public network address;*

*receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and*

*forwarding the network management request message to the cluster member network device identified by the intra-cluster identifier using the non-pubic network address of the cluster member network device.*

*55. The method according to claim 54 wherein said forwarding includes:*

*changing the source address field of the network management request message to contain the IP address of the commander network device; and*

*changing the destination address field of the network management request message to contain the non-public network address of the cluster member network device.*

*56. The method according to claim 55 wherein said forwarding further includes:*

*changing the request identification field of the network management request message to contain an intra-cluster request identifier.*

*57. The method according to claim 56, further comprising:*

*storing values of the source address field and the request identification field within the commander network device.*

*58. The method according to claim 56, further comprising:*

*receiving a response to the network management request message at the commander network device from the cluster member network device, wherein the response includes a source address field containing the non-public network address of the cluster member network device, a destination address field containing the IP address of the commander network device, and a response identification field containing the value of the intra-cluster request identifier;*

*changing the source address field of the response to contain the IP address of the commander network device;*

*changing the destination address field of the response to contain the IP address of the management console;*

*changing the response identification field of the response to contain the original request identifier; and*

*forwarding the response to the management console.*

*59. The method according to claim 55, further comprising:*

*receiving a response to the network management request message at the commander network device from the cluster member network device, wherein the response to the network management request message includes a source address field containing the non-public network address of the cluster member network device, and a destination address field containing the IP address of the commander network device;*

*changing the source address field of the response to the network management request message to contain the IP address of the commander network device;*

*changing the destination address field of the response to the network management request message to contain the IP address of the management console; and*

*forwarding the response to the network management request message to the management console.*

*60. The method according to claim 59, wherein the network management request message and the response to the network management request message are SNMP messages.*

*61. The method according to claim 54, wherein the first network device is a LAN switch.*

*62. The method according to claim 61, wherein the cluster member network device is a LAN switch.*

*63. The method according to claim 54 wherein said identifying a plurality of network devices to form a cluster includes:*

*defining a cluster identifier for the cluster.*

*64. The method according to claim 63 wherein the cluster identifier is an SNMP community string, and wherein the intra-cluster identifier includes the SNMP community string and a unique member string.*

*65. The method according to claim 54, wherein the network management request message is an SNMP message.*

*66. The method according to claim 54 wherein the non-public network address of the cluster member network device is a non-public IP address.*

*67. The method according to claim 54 wherein the non-public network address of the cluster member network device is a Media Access Control address.*

*68. An apparatus for managing a cluster of network devices, comprising:*

*means for identifying a plurality of network devices to form a cluster, each of the network devices being capable of interfacing at least two computer networks, and capable of receiving and processing a network management request message from a management console, each of the network devices being assigned with an intra-cluster identifier;*

*means for identifying a first network device from among the plurality of the network devices to be a commander network device, the commander network device having a public IP address, each of the remaining network devices being a cluster member network device, each cluster member network device having a non-public network address;*

*means for receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and*

*means for forwarding the network management request message to the cluster member network device identified by the intra-cluster identifier using the non-pubic IP address of the cluster member network device.*

*69. The apparatus according to claim 68 wherein said means for forwarding includes:*

*means for changing the source address field of the network management request message to contain the IP address of the commander network device; and*

*means for changing the destination address field of the network management request message to contain the non-public network address of the cluster member network device.*

*70. The apparatus according to claim 69 wherein said means for forwarding further includes:*

*means for changing the request identification field of the network management request message to contain an intra-cluster request identifier.*

*71. The apparatus according to claim 70, further comprising:*

*means for storing values of the source address field and the request identification field within the first network device.*

*72. The apparatus according to claim 70, further comprising:*

*means for receiving a response to the network management request message at the commander network device from the cluster member network device, wherein the response includes a source address field containing the non-public network address of the cluster member network device, a destination address field containing the IP address of the commander network device, and a response identification field containing the value of the intra-cluster request identifier;*

*means for changing the source address field of the response to contain the IP address of the commander network device;*

*means for changing the destination address field of the response to contain the IP address of the management console;*

*means for changing the response identification field of the response to contain the original request identifier; and*

*means for forwarding the response to the management console.*

*73. The apparatus according to claim 69, further comprising:*

*means for receiving a response to the network management request message at the commander network device from the cluster member network device, wherein the response to the network management request message includes a source address field containing the non-public network address of the cluster member network device, and a destination address field containing the IP address of the commander network device;*

*means for changing the source address field of the response to the network management request message to contain the IP address of the commander network device;*

*means for changing the destination address field of the response to the network management request message to contain the IP address of the management console; and*

*means for forwarding the response to the network management request message to the management console.*

*74. The apparatus according to claim 73, wherein the network management request message and the response to the network management request message are SNMP messages.*

*75. The apparatus according to claim 68, wherein the first network device is a LAN switch.*

*76. The apparatus according to claim 75, wherein the cluster member network device is a LAN switch.*

*77. The apparatus according to claim 68 wherein said means for identifying a plurality of network devices to form a cluster includes:*

*means for defining a cluster identifier for the cluster.*

*78. The apparatus according to claim 77 wherein the cluster identifier is an SNMP community string, and wherein the intra-cluster identifier includes the SNMP community string and a unique member string.*

*79. The apparatus according to claim 68, wherein the network management request message is an SNMP message.*

*80. The apparatus according to claim 68 wherein the non-public network address of the cluster member network device is a non-public IP address.*

*81. The apparatus according to claim 68 wherein the non-public network address of the cluster member network device is a Media Access Control address.*

*82. A first network device for redirecting network management messages in a cluster of network devices, the cluster including a plurality of cluster member network devices, each of the cluster member network devices being capable of interfacing at least two computer networks, and capable of receiving and processing a network management request message from a management console, each of the cluster member network devices being assigned with an intra-cluster identifier,*

*said first network device being one of the plurality of the cluster member network devices, each cluster member network device having a non-public network address, said first network device comprising:*

*a management interface adapted to receive a network management request message from the management console, wherein the network management request message includes a source address field containing an IP address of the management console, a destination address field containing a public IP address of the first network device, a request identification field containing an original request identifier uniquely identifying the network management request message, and an indication of an intra-cluster identifier; and*

*forwarding logic circuitry adapted to forward for the network management request message to the cluster member network device identified by the intra-cluster identifier using the non-pubic network address of the cluster member network device.*

*83. The first network device in accordance with claim 82, further comprising:*

*learning logic including:*

*a learning logic component adapted to change the source address field of the network management request message to contain the IP address of the first network device; and*

*a learning logic component adapted to change the destination address field of the network management request message to contain the non-public network address of the cluster member network device.*

*84. The first network device in accordance with claim 83, further comprising:*

*learning logic including:*

*a learning logic component adapted to change the request identification field of the network management request message to contain an intra-cluster request identifier.*

*85. The first network device in accordance with claim 84, further comprising:*

*a memory for storing values of the source address field and the request identification field within the first network device.*

*86. The first network device in accordance with claim 84,*

*wherein said management interface is further adapted to receive a response to the network management request message at the first network device from the cluster member network device, wherein the response includes a source address field containing the non-public network address of the cluster member network device, a destination address field containing the IP address of the first network device, and a response identification field containing the value of the intra-cluster request identifier;*

*wherein said learning logic further comprises:*

*a learning logic component adapted to change the source address field of the response to contain the IP address of the first network device;*

*a learning logic component adapted to change the destination address field of the response to contain the IP address of the management console; and*

*a learning logic component adapted to change the response identification field of the response to contain the original request identifier; and*

*wherein said forwarding logic circuitry is further adapted to forward the response to the management console.*

*87. The first network device in accordance with claim 83, wherein said management interface is further*

*adapted to receive a response to the network management request message from the cluster member network device, wherein the response to the network management request message includes a source address field containing the non-public network address of the cluster member network device, and a destination address field containing the IP address of the first network device;*

*wherein said learning logic further comprises:*

*a learning logic component adapted to change the source address field of the response to the network management request message to contain the IP address of the first network device; and*

*a learning logic component adapted to change the destination address field of the response to the network management request message to contain the IP address of the management console; and*

*wherein said forwarding logic circuitry is further adapted to forward the response to the network management request message to the management console.*

*88. The first network device in accordance with claim 87, wherein the network management request message and the response to the network management request message are SNMP messages.*

*89. The first network device in accordance with claim 82, wherein the first network device is a LAN switch.*

*90. The first network device in accordance with claim 89, wherein the cluster member network device is a LAN switch.*

*91. The first network device in accordance with claim 82, wherein the network management request message is an SNMP message.*

*92. The first network device in accordance with claim 82 wherein the intra-cluster identifier includes an SNMP community string defined for the cluster and a member string uniquely identifying the network device within the cluster.*

*93. The first network device in accordance with claim 82 wherein the non-public network address of the cluster member network device is a non-public IP address.*

*94. The first network device in accordance with claim 82 wherein the non-public network address of the cluster member network device is a Media Access Control address.*

*95. A program storage device readable by a machine, tangibly embodying a program of instructions executable by the machine to perform a method for managing a cluster of network devices, the method comprising:*

*identifying a plurality of network devices to form a cluster, each of the network devices being capable of interfacing at least two computer networks, and capable of receiving and processing a network management request message from a management console, each of the network devices being assigned with an intra-cluster identifier;*

*identifying a first network device from among the plurality of the network devices to be a commander network device, the commander network device having a public IP address, each of the remaining network devices being a cluster member network device, each cluster member network device having a non-public network address;*

*receiving at the commander network device a network management request message from the management console, wherein the network management request message includes a source address field containing an IP address of the management console, a destination address field containing the IP address of the commander network device, a request identification field containing an original request identifier uniquely identifying the network management request message, and an indication of an intra-cluster identifier; and*

*forwarding the network management request message to the cluster member network device identified by the intra-cluster identifier using the non-pubic network address of the cluster member network device.*

*96. The program storage device readable by a machine according to claim 95 wherein said forwarding includes:*

*changing the source address field of the network management request message to contain the IP address of the commander network device; and*

*changing the destination address field of the network management request message to contain the non-public network address of the cluster member network device.*

*97. The program storage device readable by a machine according to claim 96, the method further comprising:*

*receiving a response to the network management request message at the commander network device from the cluster member network device, wherein the; response to the network management request message includes a source address field containing the non-public network address of the cluster member network device, and a destination address field containing the IP address of the commander network device;*

*changing the source address field of the response to the network management request message to contain the IP address of the commander network device:*

*changing the destination address field of the response to the network management request message to contain the IP address of the management console; and*

*forwarding the response to the network management request message to the management console.*

*98. A first network device for redirecting network management messages in a cluster of network devices, the cluster including a plurality of cluster member network devices, each of the cluster member network devices being capable of interfacing at least two computer networks, and capable of receiving and processing a network management request message from a management console, each of the cluster member network devices being assigned with an intra-cluster identifier, said first network device comprising:*

*a memory adapted to store a public IP address, said first network device being one of the plurality of the cluster member network devices, each cluster member network device having a non-public network address:*

*a management interface adapted to receive a network management request message from the management console, wherein the network management request message includes a source address field containing an IP address of the management console, a destination address field containing a public IP address of the first network device, a request identification field containing an original request identifier uniquely identifying the network management request message, and an indication of an intra-cluster identifier; and*

*forwarding logic circuitry adapted to forward for the network management request message to the cluster member network device identified by the intra-cluster identifier using the non-pubic network address of the cluster member network device.*

* * * * *

UNITED STATES PATENT AND TRADEMARK OFFICE

CERTIFICATE OF CORRECTION

PATENT NO. : RE41,750 E
APPLICATION NO. : 10/942081
DATED : September 21, 2010
INVENTOR(S) : James E. Christy It is certified that error appears in the above-identified patent and that said Letters Patent is hereby corrected as shown below:

Title Page 2, col. 1, Hee-Sook Park, Address translation mehtod for interworking between public and private ATM networks., IEEE Conf. on Information Networking, p. 669-672, Jan. 1998 should read --Hee-Sook Park, Address translation method for interworking between public and private ATM networks, IEEE Conf. on Information Networking, p. 669-672, Jan. 1998--.

Title Page 2, col. 2, Raz, D. et al., Economically managing multiple private data networks, Proceedings of Network Operations and Management Sumposium, AT&T Bell Labs, p. 491-503, Apr. 2000. should read --Raz, D. et al., Economically managing multiple private data networks, Proceedings of Network Operations and Management Symposium, AT&T Bell Labs, p. 491-503, Apr. 2000--.

Title Page 2, Cisco Systems, Inc., DHCP Solutions Helsp Scale and Configure IP Nodes in Growing Switched Networks, Sep. 10, 1998, http://cio.cisco.jp/war/public/795/6.html,, 1-2. should read --Cisco Systems, Inc., DHCP Solutions Helps Scale and Configure IP Nodes in Growing Switched Networks, Sep. 10, 1998, http://cio.cisco.jp/war/public/795/6.html,, 1-2.--.

Please add the following under Other Publications, --Kastenholz, F., "SNMP Communications Services", RFC 1270, pp. 1-11, Oct. 1991--.

Please add the following under Other Publications, --Egevang, K. et al., "The IP Network Address Translator (NAT)", RFC 1631, pp. 1-10, May 1994--.

Claim 25, Column 18, Lines 54-57, The apparatus according to claim 18 wherein the cluster-identifier is an SNMP community string, and wherein the intra-cluster identifier includes the SNMP community string and unique member string. should read --The apparatus according to claim 24 wherein the cluster-identifier is an SNMP community string, and wherein the intra-cluster identifier includes the SNMP community string and unique member string--.

Signed and Sealed this
Twenty-sixth Day of July, 2011

David J. Kappos

David J. Kappos
*Director of the United States Patent and Trademark Office*